(12) United States Patent
Aizaki et al.

(10) Patent No.: US 8,238,524 B2
(45) Date of Patent: Aug. 7, 2012

(54) MICROSCOPE COLOR IMAGE PICKUP APPARATUS, MICROSCOPE COLOR IMAGE PICKUP PROGRAM PRODUCT, AND MICROSCOPE COLOR IMAGE PICKUP METHOD

(75) Inventors: Shinichiro Aizaki, Ome (JP); Shinya Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 1276 days.

(21) Appl. No.: 11/879,404

(22) Filed: Jul. 16, 2007

(65) Prior Publication Data
US 2008/0018735 A1 Jan. 24, 2008

(30) Foreign Application Priority Data
Jul. 24, 2006 (JP) .................. 2006-200559

(51) Int. Cl.
*H04N 7/18* (2006.01)
*G02B 21/00* (2006.01)
*G06K 9/00* (2006.01)
(52) U.S. Cl. ........... 379/79; 359/368; 382/162; 382/167
(58) Field of Classification Search .................... 348/79, 348/80; 359/368; 382/162, 167
See application file for complete search history.

(56) References Cited

U.S. PATENT DOCUMENTS

| | | | |
|---|---|---|---|
| 6,388,694 B1 * | 5/2002 | Fujita ............................ | 347/236 |
| 6,766,050 B1 * | 7/2004 | Saikawa et al. ................ | 382/162 |
| 6,898,312 B2 * | 5/2005 | Schroder ........................ | 382/167 |
| 6,917,377 B2 * | 7/2005 | Aizaki et al. .................... | 348/79 |
| 2002/0136452 A1 * | 9/2002 | Schroder ........................ | 382/165 |
| 2004/0119860 A1 * | 6/2004 | Vogel et al. .................... | 348/272 |
| 2004/0240728 A1 * | 12/2004 | Saikawa et al. ............... | 382/162 |
| 2006/0007458 A1 * | 1/2006 | Hardy ............................. | 358/1.9 |

FOREIGN PATENT DOCUMENTS

| | | |
|---|---|---|
| JP | 11-113006 | 4/1999 |
| JP | 2003-230154 | 8/2003 |
| JP | 2004-056587 | 2/2004 |
| JP | 2004-235851 | 8/2004 |

OTHER PUBLICATIONS

Notice of Rejection Grounds, dated Jul. 12, 2011, issued in corresponding Japanese Patent Application No. 2006-200559.

* cited by examiner

*Primary Examiner* — George C Neurauter
(74) *Attorney, Agent, or Firm* — Kenyon & Kenyon LLP

(57) ABSTRACT

An apparatus includes: an image pickup unit capturing a color image observed by the microscope; a camera characteristic information storage unit storing camera characteristic information about a characteristic of the microscope color image pickup apparatus; a color correction parameter calculation unit calculating a color correction parameter for a color correcting process on the color image captured by the image pickup unit according to the color image captured by the image pickup unit and the camera characteristic information stored in the camera characteristic information storage unit; and a color correcting unit performing a color correcting process on the color image captured by the image pickup unit according to the color correction parameter calculated by the color correction parameter calculation unit.

8 Claims, 20 Drawing Sheets

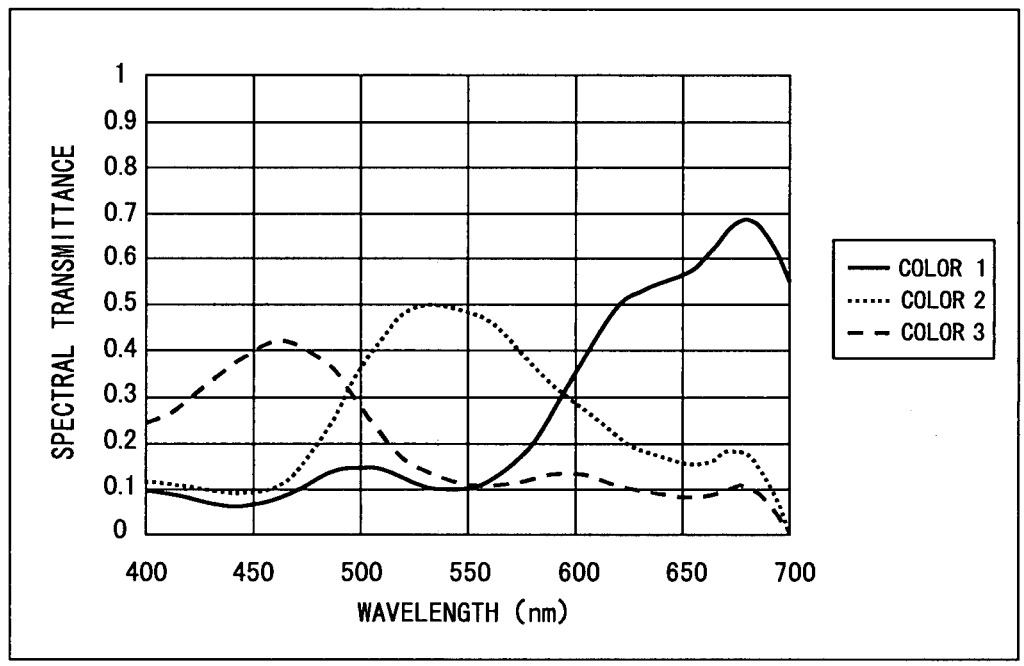
|         | R   | G   | B   |
|---------|-----|-----|-----|
| COLOR 1 | 216 | 34  | 24  |
| COLOR 2 | 82  | 170 | 56  |
| COLOR 3 | 18  | 75  | 166 |
F I G. 3 A
F I G. 3 B

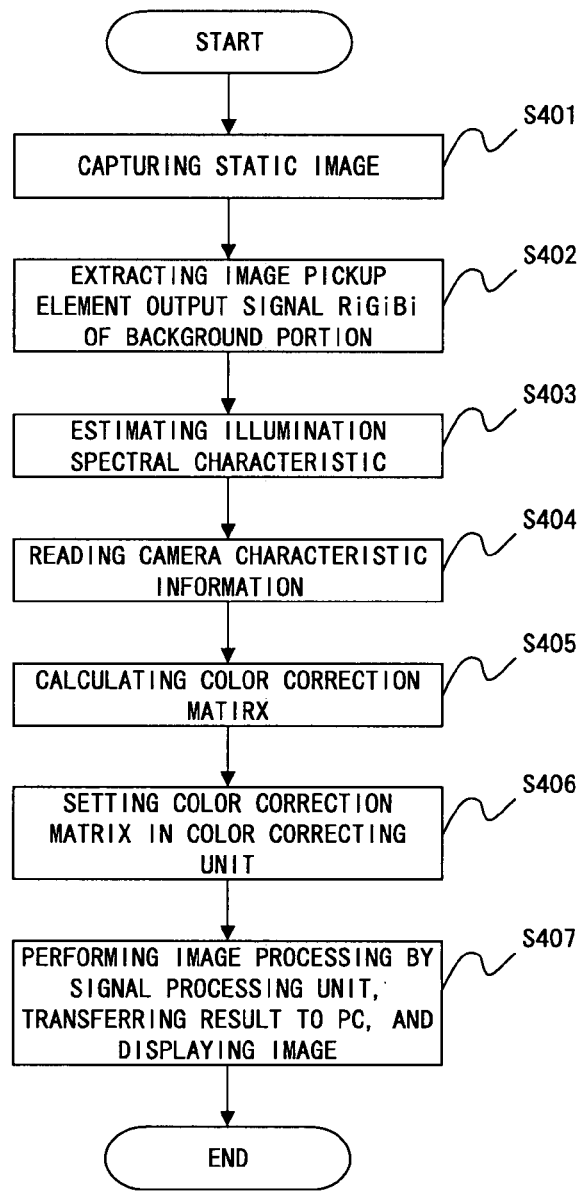
F I G. 4

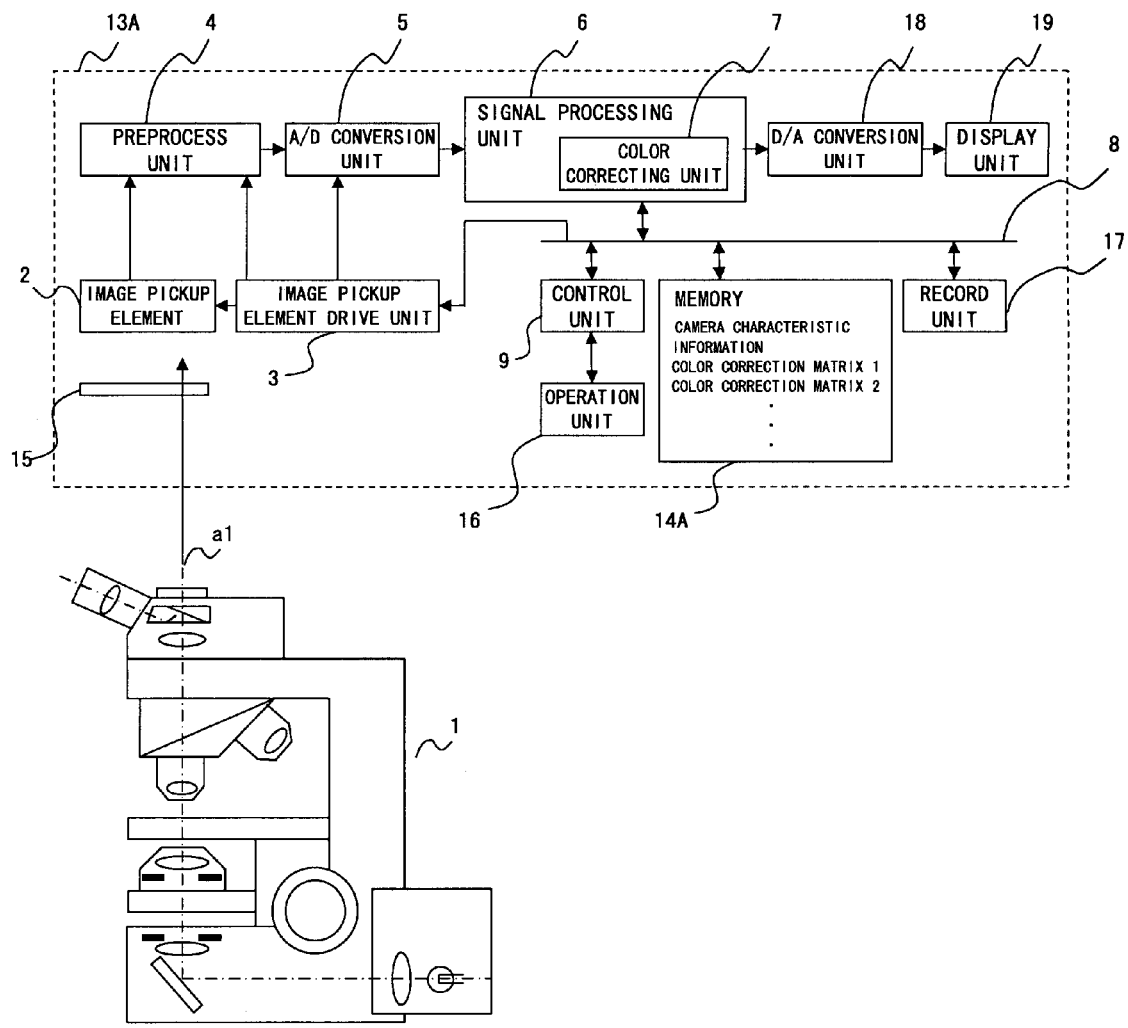
F I G. 5

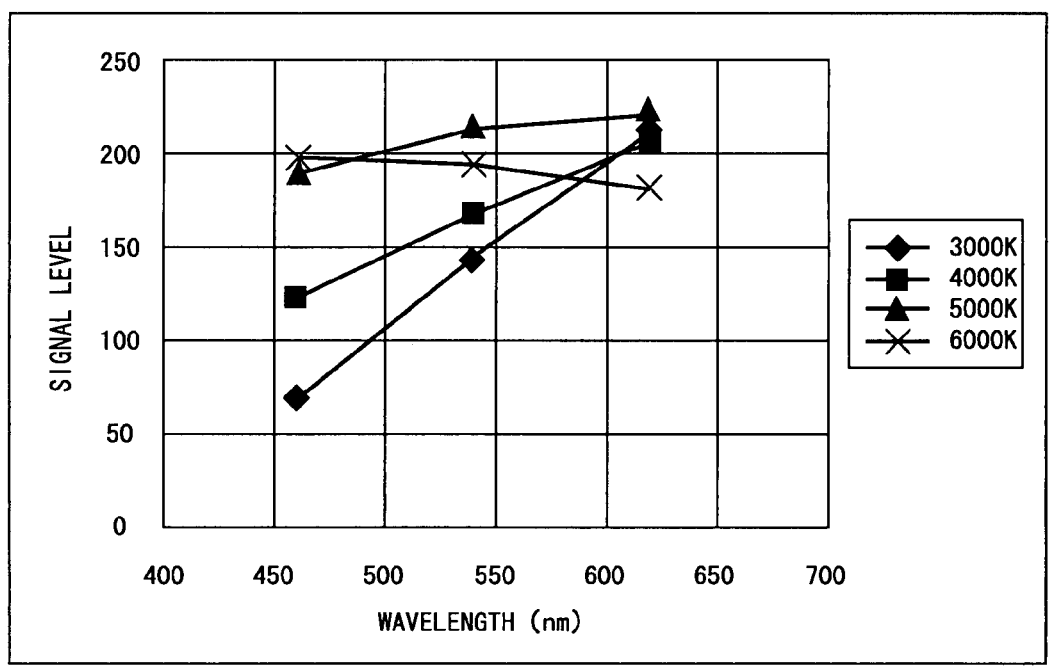
F I G. 7

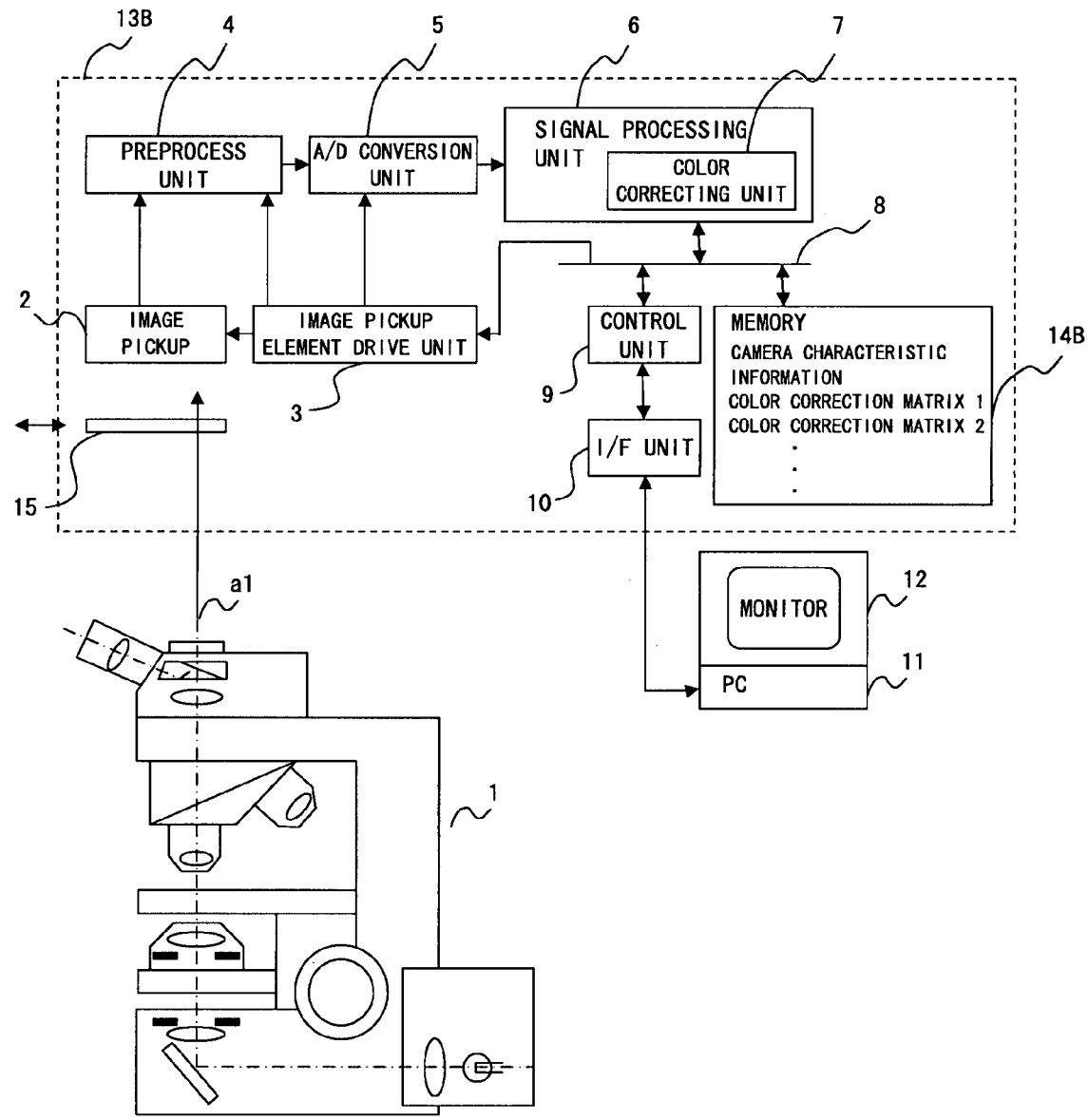
F I G. 8

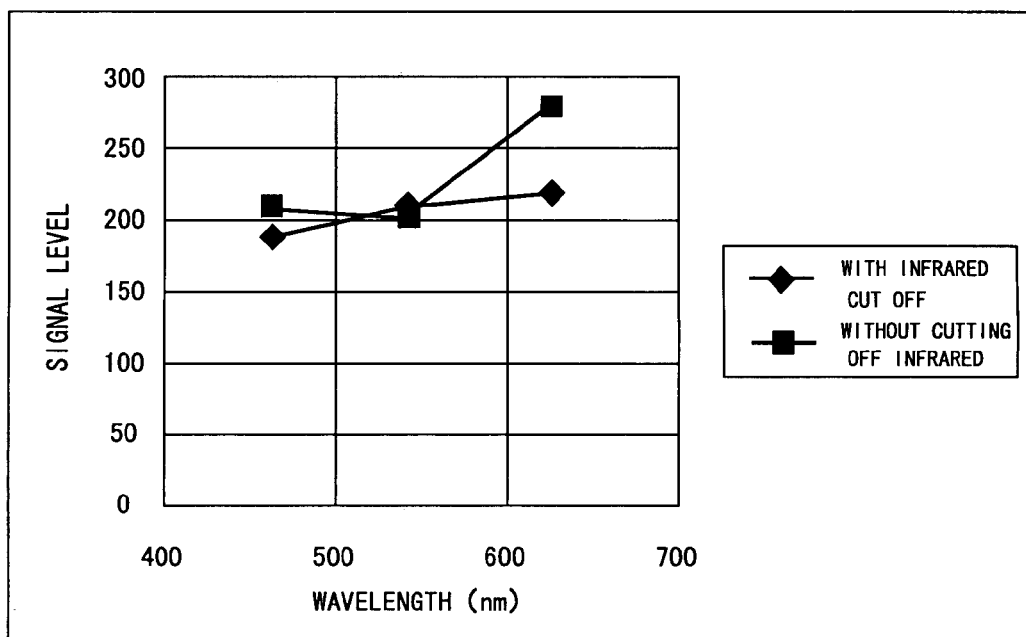
F I G. 9

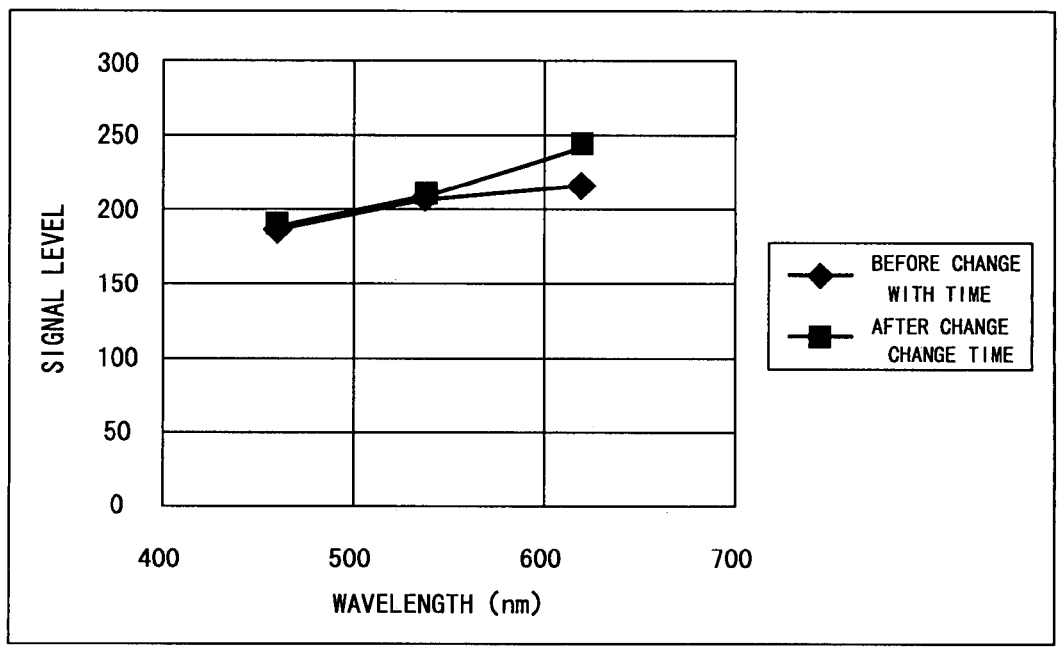
F I G. 1 1

| PATTERN | MICROSCOPE | LIGHT SOURCE | LBD | IR CUT |
|---|---|---|---|---|
| A | S | P | O | O |
| B | S | P | O | × |
| C | S | Q | × | O |
| D | S | Q | × | × |
| E | T | P | O | O |
| F | T | P | O | × |
| G | T | Q | × | O |
| H | T | Q | × | × |

FIG. 14

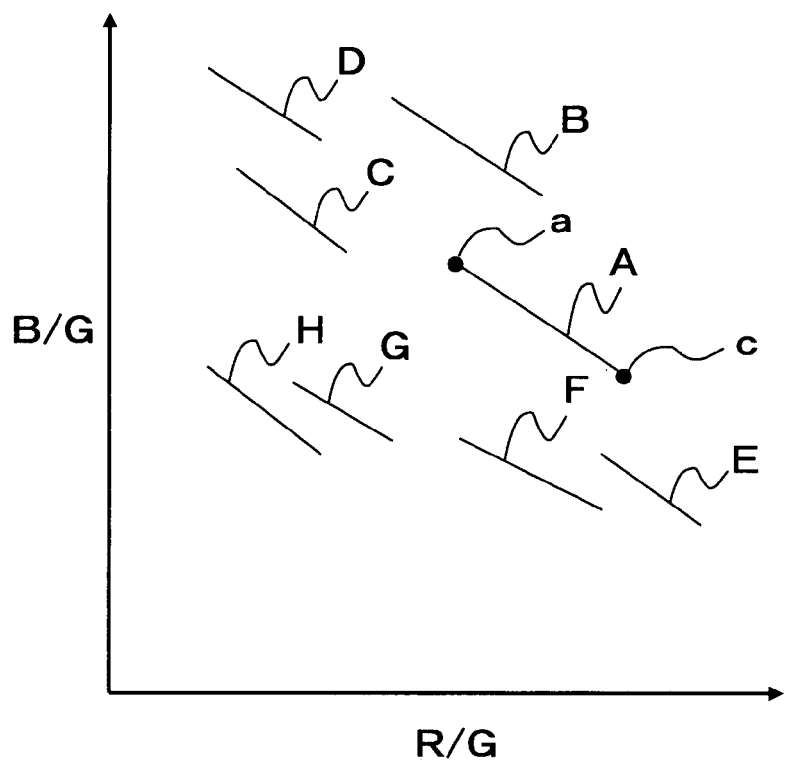
F I G. 15

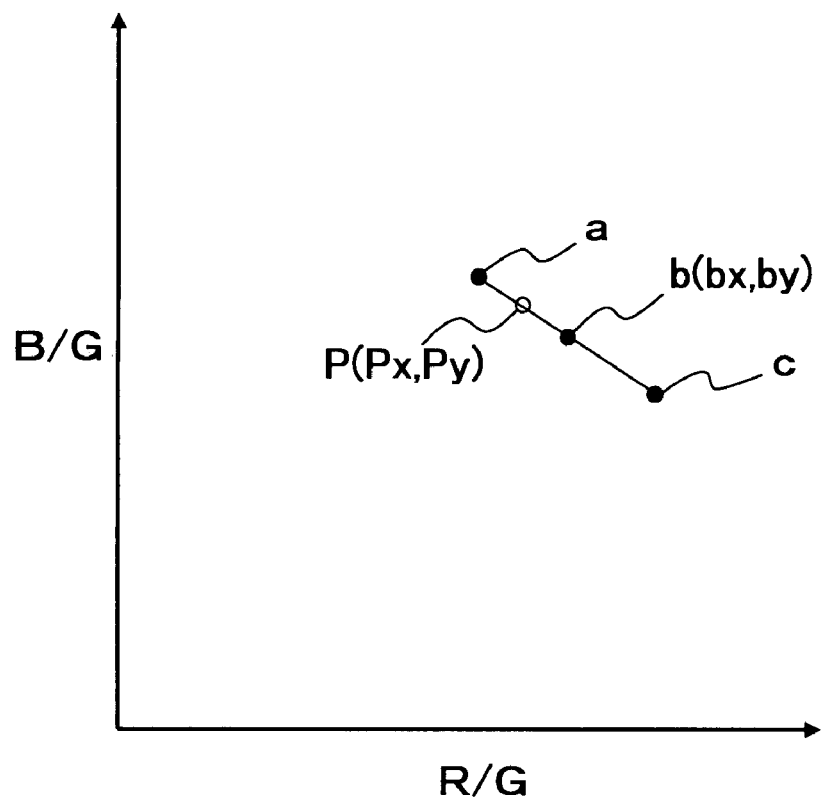
F I G. 18

MICROSCOPE COLOR IMAGE PICKUP APPARATUS, MICROSCOPE COLOR IMAGE PICKUP PROGRAM PRODUCT, AND MICROSCOPE COLOR IMAGE PICKUP METHOD

CROSS REFERENCE TO RELATED APPLICATIONS

This application is based upon and claims the benefit of priority from the prior Japanese Patent Application No. 2006-200559, filed on Jul. 24, 2006, the entire contents of which are incorporated herein by reference.

BACKGROUND OF THE INVENTION

1. Field of the Invention

The present invention relates to a microscope color image pickup apparatus, a microscope color image pickup program product, and a microscope color image pickup method for capturing and recording an observed image of a sample by a microscope by using an image pickup element such as a CCD etc., and more specifically to a microscope color image pickup apparatus, a microscope color image pickup program product, and a microscope color image pickup method capable of realizing close color reproduction using a color correcting process technique.

2. Description of the Related Art

Conventionally, a microscope color image pickup apparatus such as a digital camera etc. capable of capturing a microscope observed image by an image pickup unit such as a CCD etc. as one of the peripheral devices of a microscope.

FIG. 1 is a block diagram showing an example of a rough configuration of the conventional microscope color image pickup apparatus.

In FIG. 1, a microscope color image pickup apparatus 100 includes an image pickup element 101, an image pickup element drive unit 102 for driving the image pickup element 101, a preprocess unit 103, an AD conversion unit 104, a signal processing unit 105, a bus 106, a control unit 107, and an I/F unit 108. The microscope color image pickup apparatus 100 is connected to a personal computer 109 through the I/F unit 108, and performs an operation, display, recording, etc. by the personal computer 109.

The image pickup element 101 can be, for example, a monoplate three primary color CCD etc. in a Bayer array etc. The signal processing unit 105 perform various signal processing operations such as a color correcting process, an outline emphasizing process, a gray scale correcting process, etc. A light source 201 of a microscope 200 can mainly be a halogen lamp, but the color temperature of the halogen lamp changes depending on the voltage. Furthermore, since the color temperature of the halogen lamp itself is low, a color temperature conversion filter can be inserted and used. Thus, it is desired that the color correcting process is switched depending on the color temperature if close color reproduction is to be performed using any light source 201 when the illumination of the light source 201 is variable.

The microscope color image pickup apparatus 100 acquires an observed image as an electric signal by the image pickup element 101, converts the signal, and records the conversion result as image data. To acquire a clear image with highest possible accuracy, various measures are taken during conversion of a signal, for example, by reducing or eliminating noise etc. Additionally, a device of making a correction to closely represent color for an observed image is developed. However, there are various types of light sources for illuminating an observed image, and the color reproducibility depends on the illumination condition of an observed image. Therefore, although the color reproducibility is optimized with a specific illumination condition, it is possible that the optimum color reproducibility cannot be obtained with other illumination conditions.

A conventional technique to solve the above-mentioned problems can be, for example, Japanese Published Patent Application No. H11-113006. The technique disclosed by the publication is a method of determining the light source according to an image signal obtained by an image pickup element. That is, using a device for recognizing an illumination light source of a subject, a color parameter applicable depending on the recognition result is changed to switch a color correcting process, thereby obtaining the optimum color reproducibility depending on the type of light source independent of the illumination condition of a subject.

The present invention aims at providing a microscope color image pickup apparatus, a microscope color image pickup program product, and a microscope color image pickup method capable of realizing close color reproduction independent of the status of an illumination light source of a microscope, the status of an optical element of a microscope and a microscope color image pickup apparatus, and a change with time of a camera.

The present invention also aims at providing a microscope color image pickup apparatus, a microscope color image pickup program product, and a microscope color image pickup method for guaranteeing the optimum color reproducibility independent of a combination of a microscope, a filter, and a light source used during observation.

SUMMARY OF THE INVENTION

The microscope color image pickup apparatus according to the present invention is an apparatus for use in a microscope, and includes: an image pickup unit for capturing a color image observed by the microscope; a camera characteristic information storage unit storing camera characteristic information about a characteristic of the microscope color image pickup apparatus; a color correction parameter calculation unit for calculating a color correction parameter for a color correcting process on the color image captured by the image pickup unit according to the color image captured by the image pickup unit and the camera characteristic information stored in the camera characteristic information storage unit; and a color correcting unit for performing a color correcting process on the color image captured by the image pickup unit according to the color correction parameter calculated by the color correction parameter calculation unit.

BRIEF DESCRIPTION OF THE DRAWINGS

The present invention will be more apparent from the following detailed description when the accompanying drawings are referenced.

FIG. 3A shows the RGB component s of colors 1 through 3 as target color information;

FIG. 3B shows a spectral transmittance for the wavelengths of the colors 1 through 3 as target color information;

FIG. 4 is a flowchart showing the flow of the color image pickup process performed by the microscope color image pickup apparatus 13;

FIG. 5 is a block diagram showing a rough configuration of a microscope color image pickup apparatus 13A according to a variation of the first mode for embodying the present invention;

FIG. 7 shows a signal level when Ri, Gi, and Bi are divided by CamR, CamG, and CamB;

FIG. 8 is a block diagram showing a rough configuration of a microscope color image pickup apparatus 13B according to the second mode for embodying the present invention;

FIG. 9 shows a signal level of the spectral characteristic of each color components of RGB when an infrared cutoff filter 15 is attached and not attached to the microscope color image pickup apparatus 13B;

FIG. 11 shows the relationship of I (460), I (540), and I (620) before and after the change with time;

FIG. 14 shows an example of a pattern of a combination of optical systems of an observation apparatus;

FIG. 15 shows a chromaticity distribution data stored by a chromaticity distribution storage unit 1402 as a distribution chart;

FIG. 18 shows the chromaticity distribution data according to the fifth mode for embodying the present invention as a distribution chart.

DESCRIPTION OF THE PREFERRED EMBODIMENTS

Figure 1:
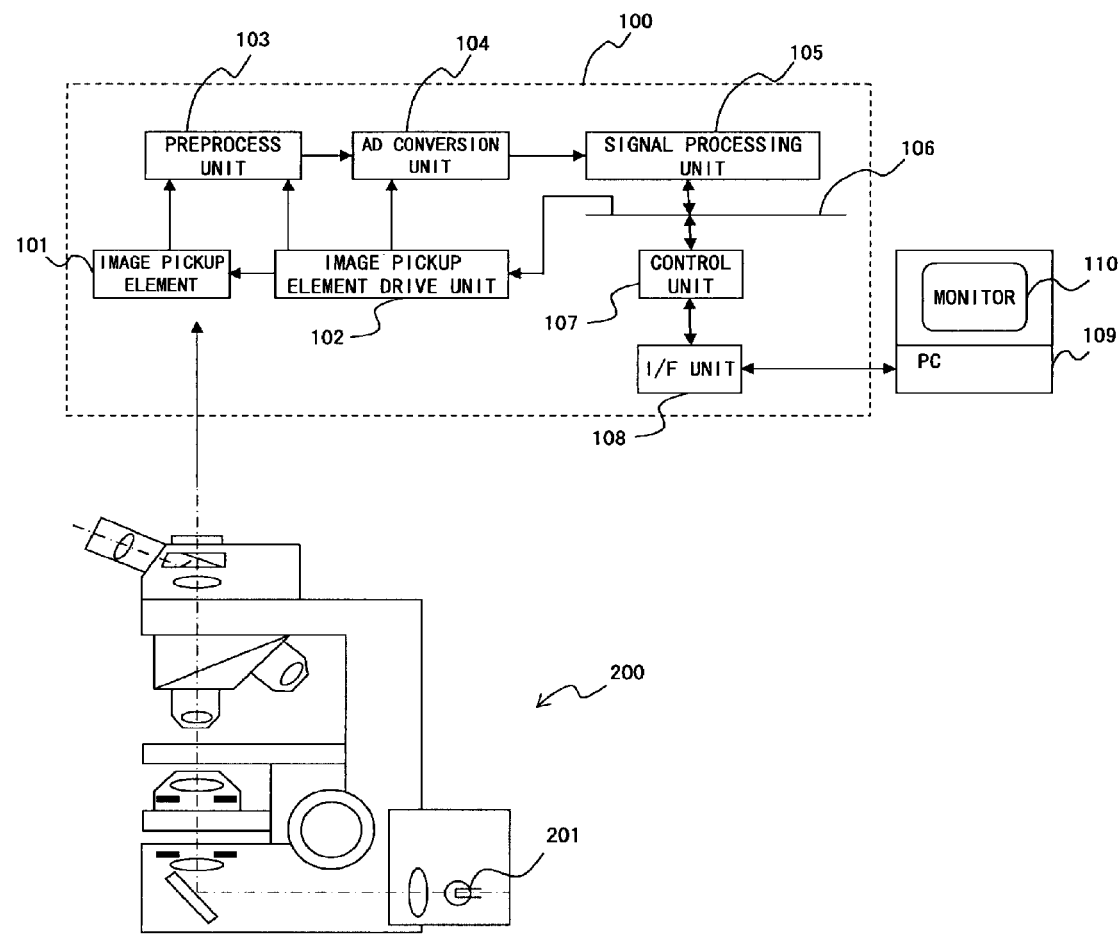
FIG. 1 is a block diagram showing an example of a rough configuration of the conventional microscope color image pickup apparatus.

The mode for embodying the present invention is described below by referring to the attached drawings.

According to an aspect of the present invention, the microscope color image pickup apparatus of the present invention is an apparatus for use in a microscope, and includes: an image pickup unit for capturing a color image observed by the microscope; a camera characteristic information storage unit storing camera characteristic information about a characteristic of the microscope color image pickup apparatus; a color correction parameter calculation unit for calculating a color correction parameter for a color correcting process on the color image captured by the image pickup unit according to the color image captured by the image pickup unit and the camera characteristic information stored in the camera characteristic information storage unit; and a color correcting unit for performing a color correcting process on the color image captured by the image pickup unit according to the color correction parameter calculated by the color correction parameter calculation unit.

It is preferable that the microscope color image pickup apparatus according to the present invention further includes: an illumination light source estimation unit for estimating a type of an illumination light source of the microscope on a basis of a color image captured by the image pickup unit and the camera characteristic information stored in the camera characteristic information storage unit; and a color correction parameter storage unit storing a plurality of color correction parameters calculated by the color correction parameter calculation unit. With the configuration, the color correcting unit acquires a color correction parameter corresponding to the illumination light source estimated by the illumination light source estimation unit from the color correction parameter storage unit, and performs a color correcting process on the color image captured by the image pickup unit on a basis of the acquired color correction parameter.

It is also preferable that the microscope color image pickup apparatus according to the present invention further includes: an optical element detection unit for detecting an optical element inserted into an optical path in which the illumination light travels from the illumination light source of the microscope to the image pickup unit on a basis of the color image captured by the image pickup unit and the camera characteristic information stored in the camera characteristic information storage unit; and a color correction parameter storage unit storing the plurality of color correction parameters calculated by the color correction parameter calculation unit. With the configuration, it is preferable that the color correcting unit acquires the color correction parameter corresponding to the optical element detected by the optical element detection unit, and performs the color correcting process on the color image captured by the image pickup unit using the acquired color correction parameter.

It is also preferable that, in the microscope color image pickup apparatus, the color correcting unit acquires a color correction parameter corresponding to no detecting an optical element from the color correction parameter storage unit when no optical element is detected by the optical element detection unit, and performs a color correcting process on the color image captured by the image pickup unit using the acquired color correction parameter.

It is also preferable that, in the microscope color image pickup apparatus according to the present invention, the optical element is an optical filter.

It is also preferable that the microscope color image pickup apparatus according to the present invention further includes: a change-with-time detection unit for detecting a change with time of the camera characteristic information on a basis of the color image captured by the image pickup unit and the camera characteristic information stored in the camera characteristic information storage unit; and a color correction parameter storage unit storing the plurality of color correction parameters calculated by the color correction parameter calculation unit. With the configuration, the color correcting unit acquires the color correction parameter corresponding to the change with time detected by the change-with-time detection unit from the color correction parameter storage unit, and performs a color correcting process on the color image captured by the image pickup unit using the acquired color correction parameter.

It is also preferable that, the microscope color image pickup apparatus according to the present invention, the camera characteristic information indicates a spectral sensitivity characteristic of the microscope color image pickup apparatus or an integral value of the spectral sensitivity characteristic.

According to another aspect of the present invention, the microscope color image pickup program product according to the present invention is a product used to direct a computer of the microscope color image pickup apparatus for use in a microscope to perform the function including: an image pickup procedure for capturing a color image observed by the microscope; a camera characteristic information storage procedure storing camera characteristic information about a characteristic of the microscope color image pickup apparatus; a color correction parameter calculation procedure for calculating a color correction parameter for a color correcting process on the color image captured by the image pickup procedure according to the color image captured by the image pickup procedure and the camera characteristic information stored in the camera characteristic information storage procedure; and a color correcting procedure for performing a color correcting process on the color image captured by the image pickup procedure according to the color correction parameter calculated by the color correction parameter calculation procedure.

According to a further aspect of the present invention, the microscope color image pickup method of the present invention is used in a microscope color image pickup apparatus for use in a microscope. In the method, an image pickup unit captures a color image observed by the microscope, a color correction parameter calculation unit calculates a color correction parameter for use in a color correcting process on the captured color image on a basis of the captured color image and camera characteristic information about a characteristic of the microscope color image pickup apparatus stored in the camera characteristic information storage unit, and a color correcting unit performs a color correcting process on the captured color image on a basis of the calculated color correction parameter.

According to a further aspect of the present invention, the microscope color image pickup apparatus according to the present invention is an apparatus for use in a microscope, and includes: an image pickup unit for capturing a color image observed by the microscope; and an optical system combination detection unit for detecting a combination of optical systems of the microscope on a basis of the color image captured by the image pickup unit.

It is preferable that the microscope color image pickup apparatus according to the present invention further includes: a camera characteristic information storage unit storing camera characteristic information about a characteristic of the microscope color image pickup apparatus; a color correction parameter calculation unit for calculating a color correction parameter for performing a color correcting process on the color image captured by the image pickup unit on a basis of the color image captured by the image pickup unit and the camera characteristic information stored in the camera characteristic information storage unit; and a color correcting unit for performing a color correcting process on the color image captured by the image pickup unit. With the configuration, the color correcting unit acquires the color correction parameter corresponding to the combination detected by the optical system combination detection unit from the color correction parameter storage unit, and performs a color correcting process on the color image captured by the image pickup unit using the acquired color correction parameter.

It is preferable that, in the microscope color image pickup apparatus according to the present invention, the optical system combination detection unit detects a type of the microscope, a type of an illumination light source mounted in the microscope, or a type of optical filter inserted into an optical path of illumination light emitted from the illumination light source.

It is preferable that, in the microscope color image pickup apparatus according to the present invention, the optical system combination detection unit detects the combination on a basis of two-dimensional color space distribution using a color signal before adjusting white balance.

It is preferable that, the microscope color image pickup apparatus according to the present invention further includes a display control unit for displaying a combination of optical systems of the microscope detected by the optical system combination detection unit.

It is further preferable that the microscope color image pickup apparatus according to the present invention further includes: a color temperature determination unit for determining a color temperature of the illumination light source on a basis of a color image captured by the image pickup unit; and a light source adjustment display unit for displaying an adjustment instruction for color temperature on a basis of a result determined by the color temperature determination unit.

It is further preferable that, in the microscope color image pickup apparatus according to the present invention, the color temperature determination unit determines a color temperature on a basis of a two-dimensional color space distribution using a color signal before the white balance is adjusted on the color image.

It is preferable that, in the microscope color image pickup apparatus according to the present invention, the optical system combination detection unit evaluates the color signal output in an RGB format in a two-dimensional space regulated by mutually orthogonal R/G axis and B/G axis.

It is preferable that, in the microscope color image pickup apparatus according to the present invention, the optical system combination detection unit refers to chromaticity information stored in advance in the two-dimensional space.

It is further preferable that, in the microscope color image pickup apparatus according to the present invention, the optical system combination detection unit estimates brightness information about the illumination light source.

According to a further aspect of the present invention, the microscope color image pickup program product according to the present invention is used to direct a computer of the microscope color image pickup apparatus for use in a microscope to function including: an image pickup procedure for capturing a color image observed by the microscope; and an optical system combination detection procedure for detecting a combination of optical systems of the microscope on a basis of the color image captured by the image pickup procedure.

According to a further aspect of the present invention, the microscope color image pickup method according to the present invention is a method for use with the microscope color image pickup apparatus for use in a microscope. With the configuration, the image pickup unit captures a color image observed by the microscope, and an optical system combination detection unit detects a combination of optical systems of the microscope on a basis of the color image captured by the image pickup unit.

First described below is the first mode for embodying the present invention.

Figure 2A:
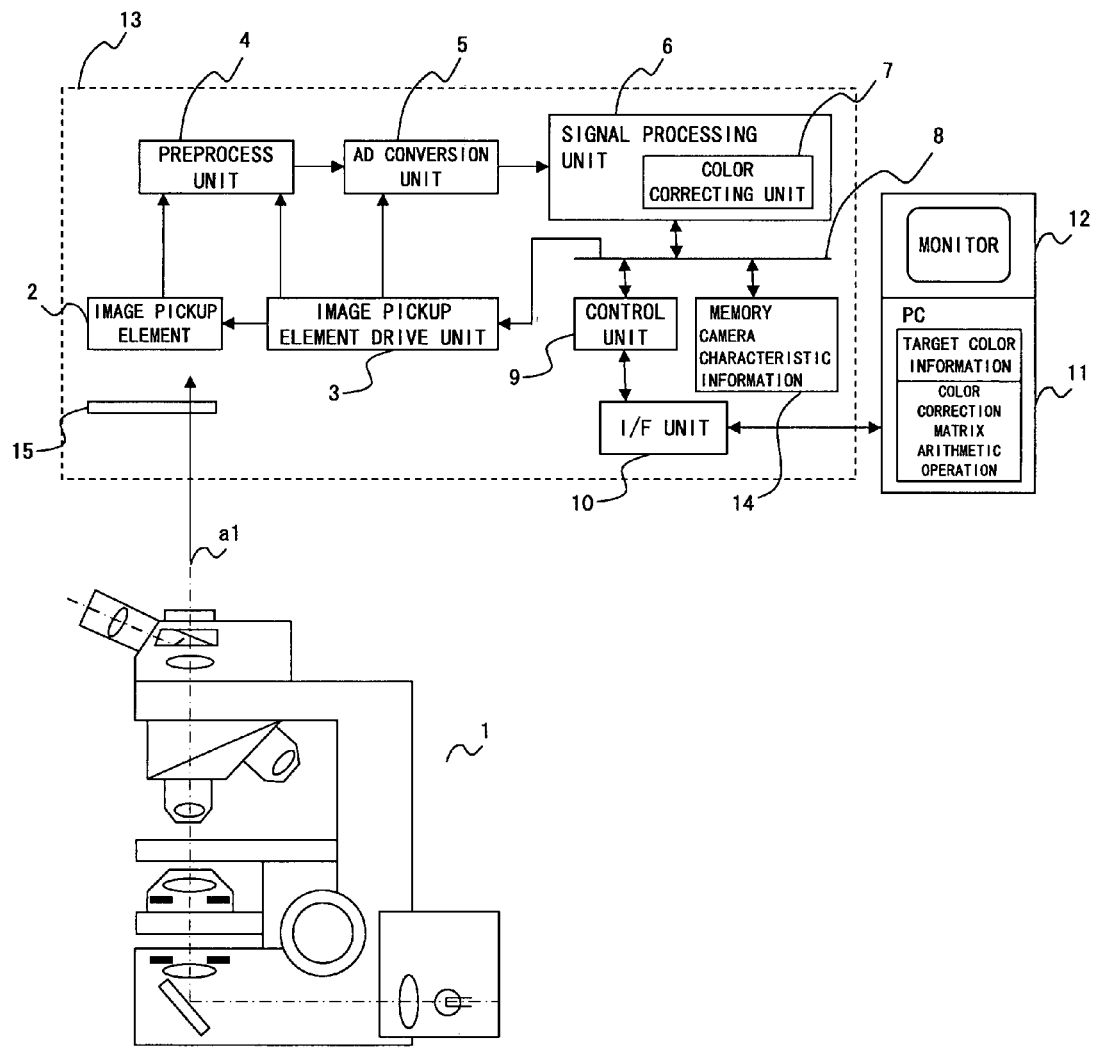
FIG. 2A is a block diagram showing a rough configuration of a microscope color image pickup apparatus 13 according to a first mode for embodying the present invention.

FIG. 2A is a block diagram of a rough configuration of the microscope color image pickup apparatus 13 according to the first mode for embodying the present invention.

In FIG. 2A, a microscope body 1 enables an observed image of a sample not shown in FIG. 2A to be visually observed, and derived outside the microscope body 1 along an optical observation path a1.

On the optical observation path a1 outside the microscope body 1, an image pickup element 2 such as a CCD etc. is arranged at the position on which the observed image from the microscope body 1 is projected. The image pickup element 2 is driven for an exposing time on the basis of a drive signal from an image pickup element drive unit 3, and an output signal is output to a preprocess unit 4. The preprocess unit 4 converts an output signal from the image pickup element 2 into a video signal by a control pulse received from the image pickup element drive unit 3, and outputs the output signal from the image pickup element 2 to an A/D conversion unit 5. The A/D conversion unit 5 digitizes an analog video signal from the preprocess unit 4 on the basis of a clock signal from the image pickup element drive unit 3. The video signal digitized by the A/D conversion unit 5 is input to a signal processing unit 6.

The signal processing unit 6 has a color correcting unit 7, the color correcting unit 7 applies a color correction matrix to the input video signal to correct color, signal processing such as correcting a gray scale is performed by a gray scale correcting unit not shown in the attached drawings, and the result is output to a control unit 9 through a bus 8. The color correcting process that applies the color correction matrix by the color correcting unit 7 can be represented by the following equation 1.

$$\begin{pmatrix} Rout \\ Gout \\ Bout \end{pmatrix} = M \cdot \begin{pmatrix} Rccd \\ Gccd \\ Bccd \end{pmatrix} \quad \text{equation 1}$$

where $$\begin{pmatrix} Rccd \\ Gccd \\ Bccd \end{pmatrix}$$

indicates the video signal input to the color correcting unit 7, $$\begin{pmatrix} Rout \\ Gout \\ Bout \end{pmatrix}$$

indicates a video signal output from the color correcting unit 7, and M indicates a color correction matrix as represented below by the equation 2.

$$M = \begin{pmatrix} m11 & m12 & m13 \\ m21 & m22 & m23 \\ m31 & m32 & m33 \end{pmatrix} \quad \text{equation 2}$$

A personal computer (hereinafter referred to as a PC) 11 is connected to the control unit 9 through an I/F (interface) 10. The PC 11 is provided with a monitor 12, and has the functions of display, record, and operation. The PC 11 can operate a microscope color image pickup apparatus 13 by an input instruction from a mouse and a keyboard not shown in the attached drawings.

Figure 12:
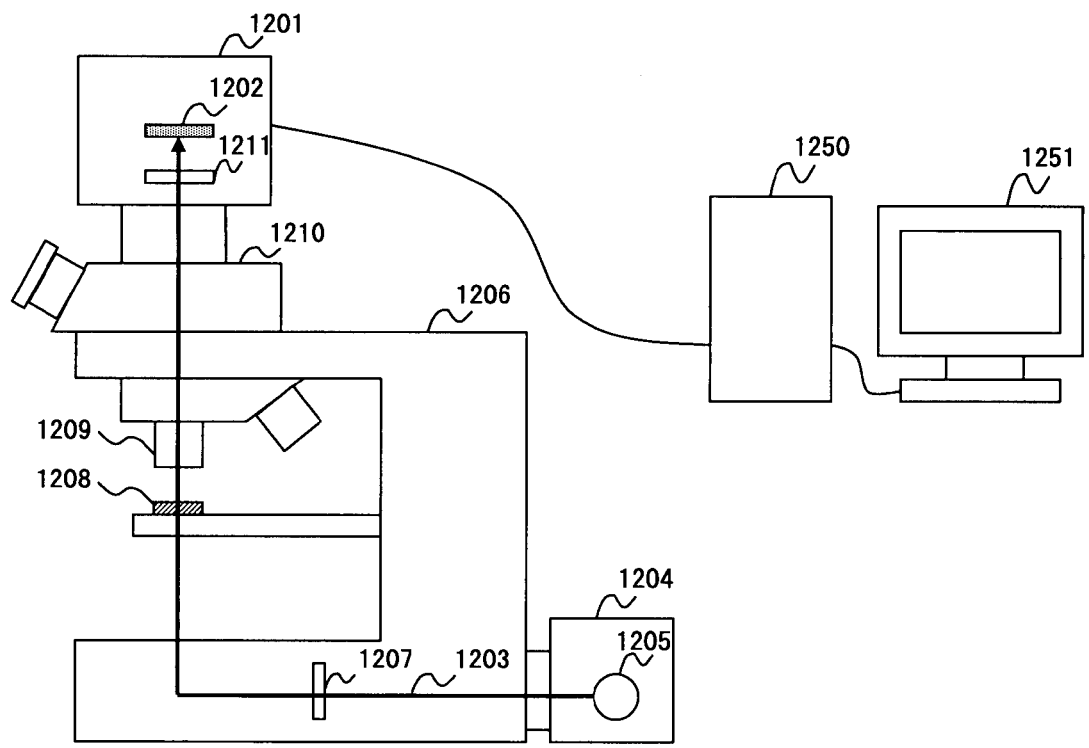
FIG. 12 shows the entire configuration of the system for use in the fourth mode for embodying the present invention.

Memory 14 storing camera characteristic information is also connected to the bus 8, and the camera characteristic information can be read at an instruction from the control unit 9. The camera characteristic information stored in the memory 14 is a spectral sensitivity characteristic, that is the spectral sensitivity r ($\lambda$), g ($\lambda$), and b ($\lambda$), of the R component, G component, and B component respectively of the microscope color image pickup apparatus 13, and has the characteristic as shown in FIG. 12. That is, in FIG. 2B, the spectral sensitivity r ($\lambda$) of the R component of the microscope color image pickup apparatus 13 has a peak around the wavelength of 620 nm, the spectral sensitivity g ($\lambda$) of the G component has a peak around the wavelength of 540 nm, and the spectral sensitivity b ($\lambda$) of the B component has a peak around the wavelength of 460 nm. The spectral sensitivity characteristic is a combination of the spectral sensitivity of the image pickup element 2 itself and the spectral transmittance characteristic of the infrared cutoff filter 15.

The PC 11 stores the target color information of three or more colors. The target color information refers to what RGB signal is to be output from the color having a spectral transmittance characteristic when an image capturing process is performed by the microscope color image pickup apparatus 13. As an example, the combination of three colors of the colors 1, 2, and 3 are shown in FIGS. 3A and 3B.

FIG. 3A shows the RGB components of the colors 1 through 3, and FIG. 3B shows the spectral transmittance for the wavelengths of the colors 1 through 3.

The RGB value of the color 1 through 3 can be optionally set as a design matter of the microscope color image pickup apparatus 13. The color correction matrix of the color correcting unit 7 can calculate the optimum color correction matrix from the image data of a sample and the camera characteristic information in the PC 11, and make a switch through the control unit 9.

Described next is the optimum color correction matrix calculating method.

Assume that the spectral characteristic of the illumination light of the microscope body 1 is I (λ), the signal of each RGB component output from the image pickup element 2 when the color of the spectral transmittance of f (λ) is captured shows the following relationships.

$$Rccd = \int r(\lambda)I(\lambda)f(\lambda)d\lambda \quad \text{equation 3}$$

$$Gccd = \int g(\lambda)I(\lambda)f(\lambda)d\lambda \quad \text{equation 4}$$

$$Bccd = \int b(\lambda)I(\lambda)f(\lambda)d\lambda \quad \text{equation 5}$$

Where the following equation 6 holds for the three target colors.

$$\begin{pmatrix} R1 & R2 & R3 \\ G1 & G2 & G3 \\ B1 & B2 & B3 \end{pmatrix} = M \cdot \begin{pmatrix} \int r(\lambda)I(\lambda)f1(\lambda)d\lambda \\ \int g(\lambda)I(\lambda)f1(\lambda)d\lambda \\ \int b(\lambda)I(\lambda)f1(\lambda)d\lambda \\ \int r(\lambda)I(\lambda)f2(\lambda)d\lambda \\ \int g(\lambda)I(\lambda)f2(\lambda)d\lambda \\ \int b(\lambda)I(\lambda)f2(\lambda)d\lambda \\ \int r(\lambda)I(\lambda)f3(\lambda)d\lambda \\ \int g(\lambda)I(\lambda)f3(\lambda)d\lambda \\ \int b(\lambda)I(\lambda)f3(\lambda)d\lambda \end{pmatrix} \quad \text{equation 6}$$

Thus, the color correction matrix M can be obtained by the following equation 7.

$$M = \begin{pmatrix} R1 & R2 & R3 \\ G1 & G2 & G3 \\ B1 & B2 & B3 \end{pmatrix} \cdot \begin{pmatrix} \int r(\lambda)I(\lambda)f1(\lambda)d\lambda \\ \int g(\lambda)I(\lambda)f1(\lambda)d\lambda \\ \int b(\lambda)I(\lambda)f1(\lambda)d\lambda \\ \int r(\lambda)I(\lambda)f2(\lambda)d\lambda \\ \int g(\lambda)I(\lambda)f2(\lambda)d\lambda \\ \int b(\lambda)I(\lambda)f2(\lambda)d\lambda \\ \int r(\lambda)I(\lambda)f3(\lambda)d\lambda \\ \int g(\lambda)I(\lambda)f3(\lambda)d\lambda \\ \int b(\lambda)I(\lambda)f3(\lambda)d\lambda \end{pmatrix}^{-1} \quad \text{equation 7}$$

When the target colors are four or more, the result is obtained by the following equations 8 and 9, and the color correction matrix M is obtained by estimating the least square etc.

$$\begin{pmatrix} R1 & R2 & R3 \ldots \\ G1 & G2 & G3 \ldots \\ B1 & B2 & B3 \ldots \end{pmatrix} = M \cdot \begin{pmatrix} \int r(\lambda)I(\lambda)f1(\lambda)d\lambda \\ \int g(\lambda)I(\lambda)f1(\lambda)d\lambda \\ \int b(\lambda)I(\lambda)f1(\lambda)d\lambda \\ \int r(\lambda)I(\lambda)f2(\lambda)d\lambda \\ \int g(\lambda)I(\lambda)f2(\lambda)d\lambda \\ \int b(\lambda)I(\lambda)f2(\lambda)d\lambda \\ \int r(\lambda)I(\lambda)f3(\lambda)d\lambda \ldots \\ \int g(\lambda)I(\lambda)f3(\lambda)d\lambda \ldots \\ \int b(\lambda)I(\lambda)f3(\lambda)d\lambda \ldots \end{pmatrix} \quad \text{equation 8}$$

$$M = \begin{pmatrix} R1 & R2 & R3 \ldots \\ G1 & G2 & G3 \ldots \\ B1 & B2 & B3 \ldots \end{pmatrix} \cdot \begin{pmatrix} \int r(\lambda)I(\lambda)f1(\lambda)d\lambda \\ \int g(\lambda)I(\lambda)f1(\lambda)d\lambda \\ \int b(\lambda)I(\lambda)f1(\lambda)d\lambda \\ \int r(\lambda)I(\lambda)f2(\lambda)d\lambda \\ \int g(\lambda)I(\lambda)f2(\lambda)d\lambda \\ \int b(\lambda)I(\lambda)f2(\lambda)d\lambda \\ \int r(\lambda)I(\lambda)f3(\lambda)d\lambda \ldots \\ \int g(\lambda)I(\lambda)f3(\lambda)d\lambda \ldots \\ \int b(\lambda)I(\lambda)f3(\lambda)d\lambda \ldots \end{pmatrix}^{-1} \quad \text{equation 9}$$

As described above, if the spectral characteristic I (λ) of the illumination light is obtained, the optimum color correction matrix M can be calculated in the arithmetic operation.

Described next is the method of estimating the spectral characteristic of the illumination light.

Figure 2B:
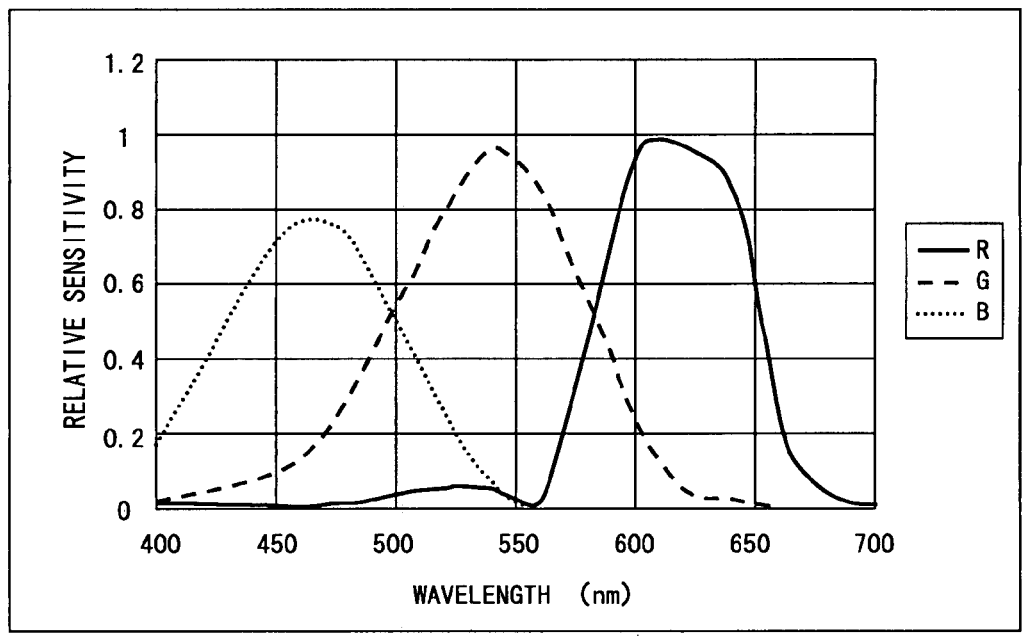
FIG. 2B shows the camera characteristic information of the microscope color image pickup apparatus.

The background portion included in the image data of a sample can be considered to be obtained by illumination light in a normal microscope. The output signals Ri, Gi, and Bi of the image pickup element 2 of this portion can be extracted automatically or by an operator of the microscope color image pickup apparatus 13 specifying an area. Since the peak wavelength of the camera spectral sensitivity of each RGB component shown in FIG. 2B is 460 nm for the B component, 540 nm for the G component, and 620 nm for the R component, the spectral characteristic of the illumination light is obtained by the following equations 10, 11, and 12 as shown below.

$$I(460)=Bi/\int b(\lambda)d\lambda \quad\quad\quad \text{equation 10}$$

$$I(540)=Gi/\int g(\lambda)d\lambda \quad\quad\quad \text{equation 11}$$

$$I(620)=Ri/\int r(\lambda)d\lambda \quad\quad\quad \text{equation 12}$$

By interpolation by, for example, the spline interpolation of the three points, the spectral characteristic I (λ) of the illumination light can be estimated. Furthermore, in the light source used in a microscope, the estimation accuracy of the spectral characteristic of the illumination light can be improved by applying restrictions of no characteristic at 380 nm, cutting off the light equal to or exceeding 700 nm using an IR cutoff filter inserted into the light source itself, etc. In this example, the center wavelength of the camera sensitivity is 460 nm for the B component, 540 nm for the G component, and 620 nm for the R component, which depends on the characteristic of the image pickup element 2, and the center wavelength depends on the image pickup element 2.

Described next is the operation of the color image pickup process performed by the microscope color image pickup apparatus 13 using the above-mentioned calculation method.

FIG. 4 is a flowchart showing the flow of the color image pickup process performed by the microscope color image pickup apparatus 13.

When the operator of the microscope body 1 aligns the sample to be captured and puts it into focus, and issues an instruction to capture the sample to the microscope color image pickup apparatus 13 using the PC 11, the color image pickup process is started.

First, in step 401, the operation of exposing the image pickup element 2 is performed. When the optical image of the sample is captured, the output signal from the image pickup element 2 is transmitted to the signal processing unit 6, the image processing such as the color correcting process etc. is bypassed, and the signal is input to the PC 11 through the bus 8, the control unit 9, and the I/F 10.

Then, in step 402, the image data RiGiBi of the background portion is extracted from the image of the sample input to the PC 11. The extraction of the background portion is performed by extracting a low chroma portion of the image or by the operator of the microscope body 1 specifying an area on the screen of the PC 11 and extracting the data of the portion. Another method can be, not extracting the RiGiBi at the stage in step 402, but eliminating the sample from the microscope body 1 before observing the sample, capturing the image as the status of only the illumination, and obtaining the data from the image.

Next, in step 403, according to the above-mentioned calculating method, the spectral characteristic of illumination light is estimated. In step 404, by the microscope body 1 issuing an instruction to the control unit 9, the camera characteristic information stored in the memory 14 of the microscope color image pickup apparatus 13 is read. In step 405, according to the above-mentioned calculating method, the color correction matrix M is calculated.

Then, in step 406, the color correction matrix M calculated in step 405 is set in the color correcting unit 7 of the signal processing unit 6.

Finally, in step 407, by the color correction matrix M set in step 406, the signal processing is performed by the color correcting unit 7 of the signal processing unit 6, and the processed image is transferred to the PC 11 through the bus 8, the control unit 9, and the I/F 10, and then displayed on the PC 11.

With the above-mentioned configuration and the operation, the color correcting process can be performed depending on the illuminating status using the optimum color correction matrix M, and the optimum color reproduction can be realized.

In the first mode for embodying the present invention, the signal processing etc. is performed in the microscope color image pickup apparatus 13. However, the image data after the AD conversion is fetched directly to the PC 11, the camera characteristic information is stored in the PC 11, and various processes can be performed by the PC 11.

Described below is an example of a variation of the first mode for embodying the present invention.

FIG. 5 is a block diagram of a rough configuration of the microscope color image pickup apparatus 13A according to an example o a variation of the first mode for embodying the present invention.

An example of a variation of the first mode for embodying the present invention is obtained by simplifying the first mode for embodying the present invention.

In FIG. 5, the microscope body 1 enables an observed image of a sample not shown in FIG. 5 to be visually observed, and derived outside the microscope body 1 along the optical observation path a1.

On the optical observation path a1 outside the microscope body 1, an image pickup element 2 such as a CCD etc. is arranged at the position on which the observed image from the microscope body 1 is projected. The image pickup element 2 is driven for an exposing time on the basis of a drive signal from the image pickup element drive unit 3, and an output signal is output to the preprocess unit 4. The preprocess unit 4 converts an output signal from the image pickup element 2 into a video signal by a control pulse received from the image pickup element drive unit 3, and outputs the output signal from the image pickup element 2 to the A/D conversion unit 5. The A/D conversion unit 5 digitizes an analog video signal from the preprocess unit 4 on the basis of a clock signal from the image pickup element drive unit 3. The video signal digitized by the A/D conversion unit 5 is input to the signal processing unit 6.

The signal processing unit 6 has the color correcting unit 7, the color correcting unit 7 applies a color correction matrix to the input video signal to correct color, signal processing such as correcting a gray scale is performed by a gray scale correcting unit not shown in the attached drawings, and the result is output to the control unit 9 through the bus 8.

The processed signal from the signal processing unit 6 is converted into an analog signal by a D/A conversion unit 18, and displayed as a moving picture on a display unit 19. At an instruction from an operation unit 16, the control unit 9 records image data as a static image from the signal processing unit 6 in a record unit 17 as a recording unit through the bus 8. Memory 14A storing the camera characteristic information and a plurality of color correction matrixes is connected to the bus 8. At an instruction from the control unit 9, reading data and setting the color correction matrix in the color correcting unit 7 can be performed. As the camera characteristic information, the integral value s CamR, CamG, CamB of the spectral sensitivity of the microscope color image pickup apparatus 13A are stored. The CamR, CamG, CamB can be represented by the following equations 13, 14, and 15.

$$CamR = \int r(\lambda) d\lambda \qquad \text{equation 13}$$

$$CamG = \int g(\lambda) d\lambda \qquad \text{equation 14}$$

$$CamB = \int b(\lambda) d\lambda \qquad \text{equation 15}$$

Described below is the operation of the microscope color image pickup apparatus 13A of an example of a variation of the present mode.

Figure 6:
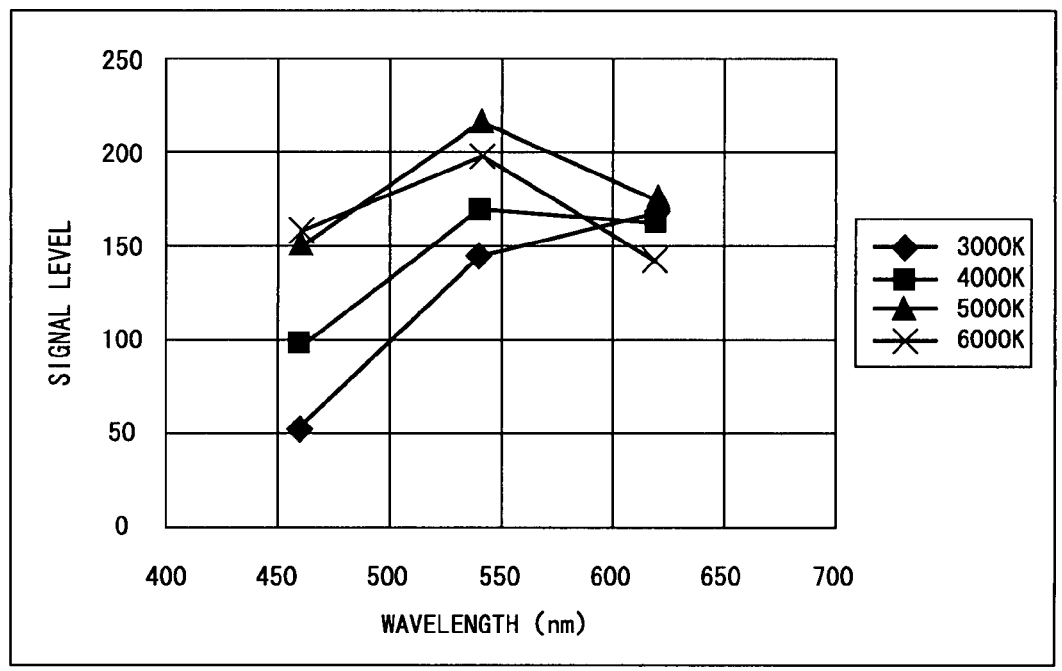
FIG. 6 shows the signal levels of the output signals Ri, Gi, and Bi from an image pickup element 2 when illumination light is a halogen lamp.

First, the operator of the microscope body 1 eliminates a sample from the microscope body 1 before capturing the sample, and enters the state in which the entire surface is filled with illumination light. In this state, the operation unit 16 issues an instruction to change the color correction matrix. The output signal s Ri, Gi, Bi from the image pickup element 2 are represented depending on the color temperature as shown in FIG. 6 when the illumination light is the light of a halogen lamp.

When the Ri, Gi, Bi are respectively divided by the above-mentioned CamR, CamG, CamB, the result is obtained as shown in FIG. 7, and each of the RGB is arranged linearly on the whole because the spectral characteristic of the halogen lamp linearly changes. Therefore, it can be considered that there is a correlation between the tilt of the lines and the color temperature of the illumination light, and the color temperature can be determined on the basis of the tilt.

When the operation unit 16 issues an instruction to change the color correction matrix, the control unit 9 performs the above-mentioned color temperature determination, selects a corresponding color correction matrix, reads the color correction matrix from the memory 14, and sets it in the color correcting unit 7.

As described above, if the PC 11 according to the first mode for embodying the present invention is not connected, and no complex computation can be performed, the optimum color correction matrix for the illumination light of the microscope body 1 can be selected, and the optimum color reproducibility can be realized.

Described below is the second mode for embodying the present invention.

FIG. 8 is a block diagram showing a rough configuration of the microscope color image pickup apparatus 13B according to the second mode for embodying the present invention.

The second mode for embodying the present invention is substantially the same as the first mode for embodying the present invention, but the infrared cutoff filter 15 before the image pickup element 2 can be inserted and removed.

In the microscopic observation, an image in an infrared area is to be acquired depending on the observing method. In the second mode for embodying the present invention, the attached/detached state of the infrared cutoff filter 15 is determined by a captured image.

Described below is the operation of the microscope color image pickup apparatus 13B according to the second mode for embodying the present invention.

First, the operator of the microscope body 1 aligns the sample to be captured and puts it into focus, and issues an instruction to capture the sample to the microscope color image pickup apparatus 13. Then, the operation of exposing the image pickup element 2 is performed. When the optical image of the sample is captured, the output signal from the image pickup element 2 is transmitted to the signal processing unit 6, the image processing such as the color correcting process etc. is bypassed, and the signal is input to the PC 11 through the bus 8, the control unit 9, and the I/F 10. Next, the image data RiGiBi of the background portion is extracted from the image of the sample input to the PC 11. The extraction of the background portion is performed by extracting a low chroma portion of the image or by the operator of the microscope body 1 specifying an area on the screen of the PC 11 and extracting the data of the portion.

Another method can be eliminating the sample from the microscope body 1 before observing the sample, capturing the image as the status of only the illumination, and obtaining the data from the image. The arithmetic operations by the following equations 16, 17, and 18 are performed on the Ri, Gi, Bi.

$$I(460) = Bi/\int b(\lambda) d\lambda \qquad \text{equation 16}$$

$$I(540) = Gi/\int g(\lambda) d\lambda \qquad \text{equation 17}$$

$$I(620) = Ri/\int r(\lambda) r\lambda \qquad \text{equation 18}$$

FIG. 9 shows the signal level of the spectral characteristic of the RGB components in the case where the infrared cutoff filter 15 is attached to the microscope color image pickup apparatus 13B and in the case where it is not attached.

When the illumination light is light of a halogen lamp, and the infrared cutoff filter 15 is attached or not attached to the microscope color image pickup apparatus 13B, the spectral characteristic is represented as shown in FIG. 9 depending on the color temperature. That is, when the infrared cutoff filter 15 is attached to the microscope color image pickup apparatus 13B, I (460), I (540), and I (609) are arranged substantially in line. When the infrared cutoff filter 15 is not attached to the microscope color image pickup apparatus 13B, the signal level of I (620) is higher than those of I (460) and I (540). Therefore, it can be determined whether or not the infrared cutoff filter 15 is attached by comparing the line made by I (460) and I (540) with I (620). On the basis of the determination result, the corresponding color correction matrix is read from memory 14B, and set in the color correcting unit 7.

In the second mode for embodying the present invention, the example of attaching and detaching the infrared cutoff filter 15 in the microscope color image pickup apparatus 13B is described, but a similar operation can be performed when an image pickup element for other purposes is attached or detached on the optical observation path a1 of the microscope body 1.

As described above, according to the second mode for embodying the present invention, the status of the image pickup element such as the infrared cutoff filter 15 etc. attached or detached in the microscope body 1 and the microscope color image pickup apparatus 13B can be detected from the image captured by the microscope color image pickup apparatus 13B, and a corresponding color correction matrix can be switched to.

Described below is the third mode for embodying the present invention.

The third mode for embodying the present invention has a configuration similar to that of the first mode for embodying the present invention. However, in the third mode for embodying the present invention, the influence of the change with time of the spectral sensitivity characteristic of the microscope color image pickup apparatus 13 is corrected, and the optimum color reproducibility can be obtained.

Described below is the operation of the microscope color image pickup apparatus 13 according to the third mode for embodying the present invention.

First, when the operator of the microscope body 1 aligns the sample to be captured and puts it into focus, and issues an instruction using the PC 11 to capture the sample to the microscope color image pickup apparatus 13. Then, the operation of exposing the image pickup element 2 is performed, and the optical image of the sample is captured. The output signal from the image pickup element 2 is transmitted to the signal processing unit 6, the image processing such as the color correcting process etc. is bypassed, and the signal is input to the PC 11 through the bus 8, the control unit 9, and the I/F 10. Then, in step 402, the image data RiGiBi of the background portion is extracted from the image of the sample input to the PC 11. The extraction of the background portion is performed by extracting a low chroma portion of the image or by the operator of the microscope body 1 specifying an area on the screen of the PC 11 and extracting the data of the portion.

Another method can be eliminating the sample from the microscope body 1 before observing the sample, capturing the image as the status of only the illumination, and obtaining the data from the image. The following equations 19, 20, and 21 are applied to Ri, Gi, Bi in the arithmetic operations.

$$I(460)=Bi \int b(\lambda)d\lambda \qquad \text{equation 19}$$

$$I(540)=Gi \int g(\lambda)d\lambda \qquad \text{equation 20}$$

$$I(620)=Ri \int r(\lambda)d\lambda \qquad \text{equation 21}$$

Figure 10:
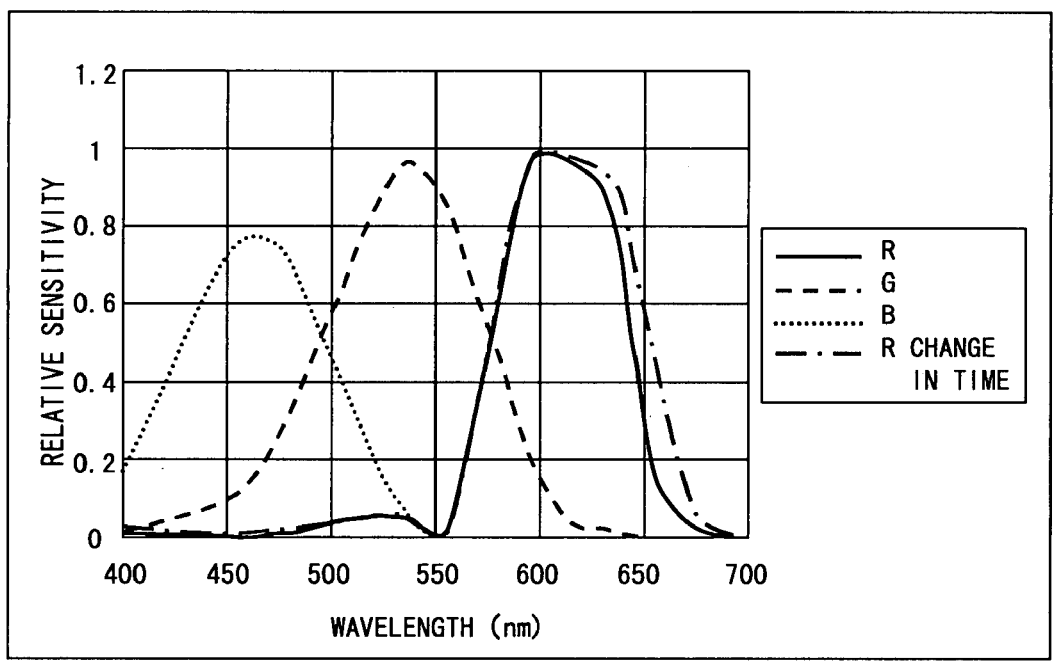
FIG. 10 shows the camera characteristic information of the microscope color image pickup apparatus when there is a change with time in the infrared cutoff filter 15.

If there is a change with time in the infrared cutoff filter 15 of the microscope color image pickup apparatus 13, the spectral sensitivity of the microscope color image pickup apparatus 13 changes as shown in FIG. 10.

The relationship among I (460), I (540), and I (620) before and after a change with time is shown in FIG. 11. That is, before a change with time, I (460), I (540), and I (620) are arranged substantially in line, but after a change with time, the signal level of I (620) is higher than those of I (460) and I (540). Therefore, by comparing the line made by I (460) and I (540) with I (620), and checking the level change of I (620), the spectral sensitivity of the microscope color image pickup apparatus 13 can be estimated. Furthermore, as described in each of the above-mentioned modes for embodying the present invention, the spectral characteristic of illumination light can be estimated from I (460) and I (540). As in the first mode for embodying the present invention, a color correction matrix is calculated from the estimated camera spectral sensitivity and illumination light, and is set in the color correcting unit 7.

As described above, according to the third mode for embodying the present invention, although there is a change with time in the spectral sensitivity characteristic of the microscope color image pickup apparatus 13, the change can be corrected and the optimum color reproducibility can be realized.

The fourth mode for embodying the present invention is described below by referring to FIGS. 12 through 16.

FIG. 12 shows the entire configuration of the system according to the fourth mode for embodying the present invention.

In FIG. 12, the system used in the fourth mode includes a microscope color image pickup apparatus 1201 provided in the observation apparatus of a microscope etc. and a PC 1250 having a monitor 1251.

The PC 1250 controls the microscope color image pickup apparatus 1201 and an image pickup element 1202. Thus, an image acquired by the image pickup element 1202 is stored in the PC 1250, and displayed on the monitor 1251.

An observation apparatus includes a lamp house 1204 containing a light source 1205, a color temperature conversion filter (hereinafter referred to as an LBD filter) 1207, an object lens 1209, and a barrel 1210. Furthermore, an infrared cut filter (hereinafter referred to as an IR cut filter) 1211 for cutting off an infrared is attached to the microscope color image pickup apparatus 1201. The 1207 and the IR cut filter 1211 are optionally attached/detached.

When an observation light 1203 is emitted from the light source 1205, the observation light 1203 passes through the microscope housing 1206 and the LBD filter 1207, and then irradiates an observation sample 1208. Afterwards, the observation light 1203 enters the 1202 through the object lens 1209, the barrel 1210, and the IR cut filter 1211.

Figure 13:
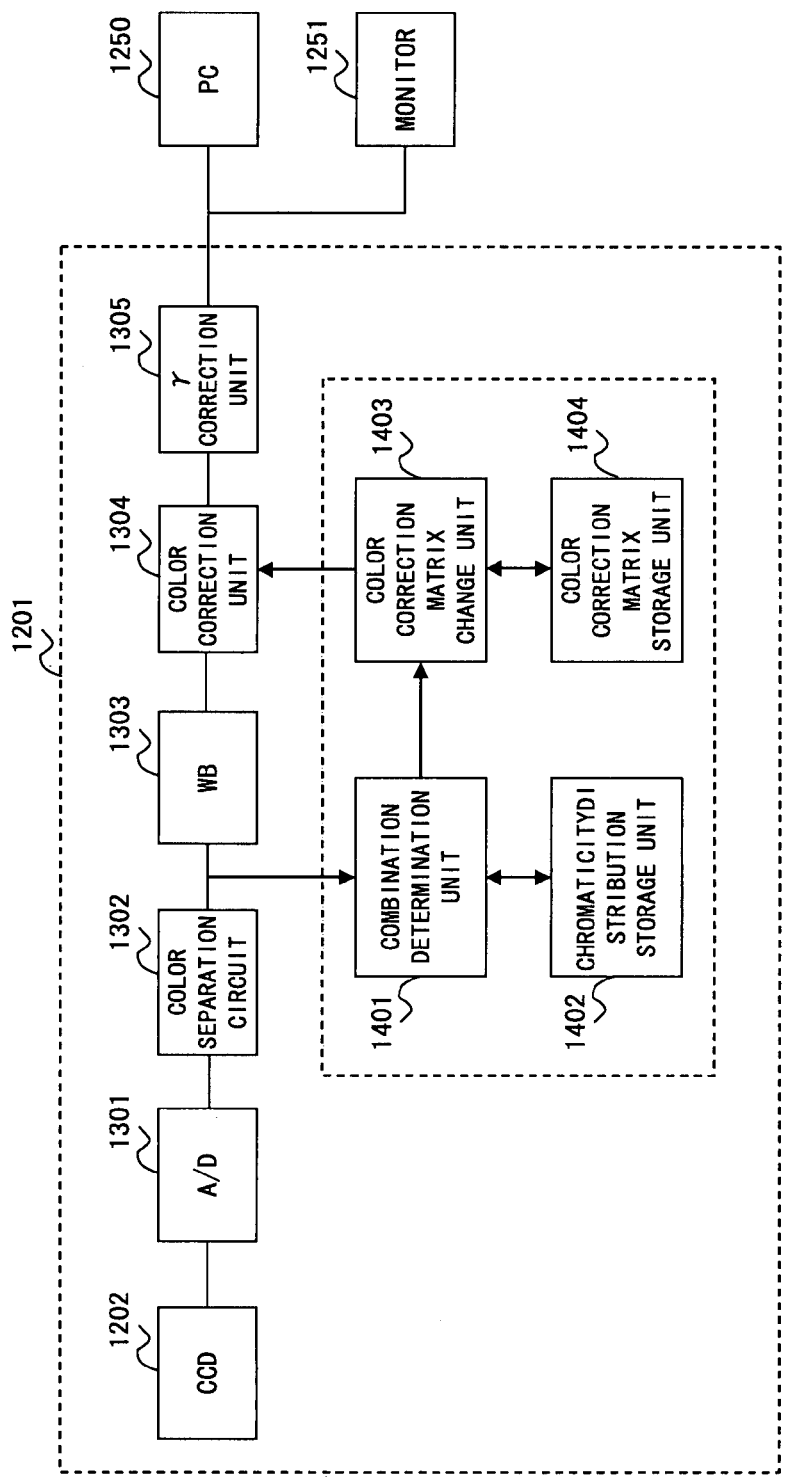
FIG. 13 is an internal block diagram of a microscope color image pickup apparatus 1201.

Next, the internal configuration of the microscope color image pickup apparatus 1201 is described by referring to FIG. 13.

FIG. 13 is a block diagram of the internal configuration of the microscope color image pickup apparatus 1201.

In FIG. 13, an A/D converter 1301 digitizes an analog signal obtained by the image pickup element 1202. A color separation circuit 1302 separates the RGB signal from a monochrome image signal digitized by the A/D converter 1301. A WB (white balance) setting unit 1303 adjusts the acquired signal value so that the white level of the RGB signal separated by the color separation circuit 1302 can be a matching value.

A color correction unit 1304 performs a color correction using a color correction matrix. A practical color correction is made as follows by setting a signal before color correction to $$R_{in} \cdot G_{in} \cdot B_{in}$$

and the signal after color correction is set to $$R_{out} \cdot G_{out} \cdot B_{out}$$

then using a predetermined color correction matrix $$M_i = \begin{pmatrix} RR_i, & RG_i, & RB_i \\ GR_i, & GG_i, & GB_i \\ BR_i, & BG_i, & BB_i \end{pmatrix}$$

is obtained such that the following equation holds.

$$\begin{pmatrix} R_{out} \\ G_{out} \\ B_{out} \end{pmatrix} = M_i \begin{pmatrix} R_{in} \\ G_{in} \\ B_{in} \end{pmatrix}$$

The color correction matrix can be rewritten.

A gamma correction unit 1305 performs a gamma correction to an input signal color-corrected by the color correction unit 1304.

The microscope color image pickup apparatus 1201 further includes, in addition to the above-mentioned common apparatus configuration, a combination determination unit 1401, a chromaticity distribution storage unit 1402, a color correction matrix change unit 1403, and a color correction matrix storage unit 1404.

The chromaticity distribution storage unit 1402 stores chromaticity distribution data obtained when a combination of optical systems of the observation apparatus is used.

FIG. 14 shows an example of combination pattern of optical systems of the observation apparatus. FIG. 15 shows chromaticity distribution data stored by the chromaticity distribution storage unit 1402 as a distribution chart.

A through H shown in FIGS. 14 and 15 are patterns of combining optical systems of the observation apparatus. For example, the pattern A indicates a type S of microscope, the light source 1205 of P, the LBD filter 1207, and the IR cut filter 1211. The combination status is shown by an example of the pattern A by a change of the color temperature depending on the supplied voltage of the light source 1205 as having a predetermined width, for example, a (dark state) to c (bright state). The data is stored in memory in advance.

The combination determination unit 1401 first calculates R/G and B/G from the RGB signal obtained by the color separation circuit 1302. Then, as compared with the combination existing in the chromaticity distribution chart shown in FIG. 15, the pattern of a combination the closest in the patterns A through H is extracted. Thus, the combination of optical systems used during observation of a sample by the observation apparatus (type of microscope, each type of filter, the light source 1205, etc.) is determined.

A color correction matrix storage unit 304 stores in advance a typical color correction matrix group ($M_A$, $M_B$ . . . ) in each optical system combination set in the chromaticity distribution storage unit 1402. The color correction matrix change unit 1403 selects a predetermined color correction matrix from the color correction matrix storage unit 1404 depending on the combination determined by the combination determination unit 1401, and rewrites the color correction matrix in the color correction unit 1304.

Next, the flow of the color correcting process performed by the microscope color image pickup apparatus 1201 is described.

Figure 16:
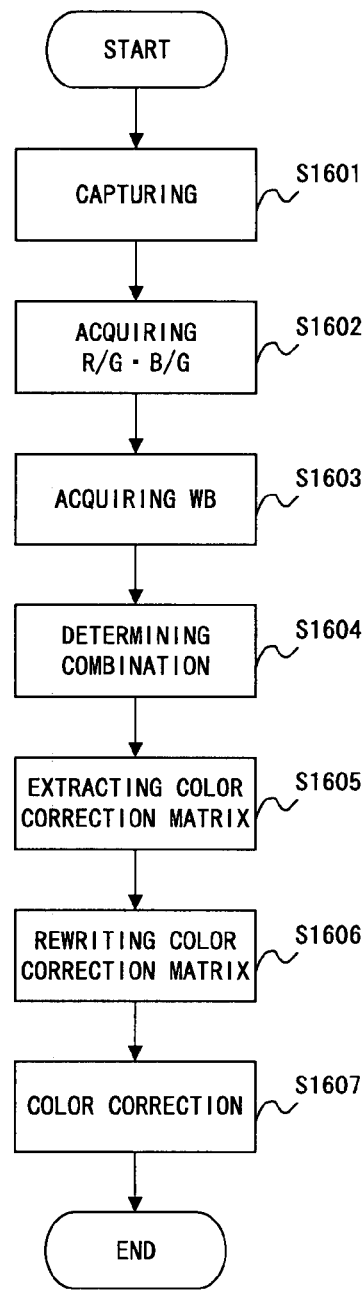
FIG. 16 is a flowchart showing a flow of the color correcting process performed by the microscope color image pickup apparatus 1201.

FIG. 16 is a flowchart of the flow of the color correcting process performed by the microscope color image pickup apparatus 1201.

First, in step S1601, when the observation sample 1208 is set in a microscope, the observation sample 1208 is removed from the microscope, and an image is captured in a no sample state. In step S1602, the acquired image signal is separated by the color separation circuit 1302, and R/G and B/G are acquired on the basis of the obtained RGB signal.

In step S1603, the WB is acquired on the basis of the R/G and B/G acquired in step S1602. In step S1604, the combination determination unit 1401 determines and derives the optical system combination during the observation.

In step S1605, the color correction matrix change unit 1403 extracts a color correction matrix corresponding to the combination from the color correction matrix storage unit 1404. Then, in step S1606, the color correction matrix in the color correction unit 1304 is overwritten by the color correction matrix extracted in step S1605.

Finally, in step S1607, the color correcting process is performed using the color correction matrix overwritten in step S1606.

In the above-mentioned method, a combination of optical systems such as the type of microscope during the observation, each filter, the light source 1205, etc. is derived, and a corresponding optimum color parameter is changed.

In step S1601, the image is captured in the state in which no observation sample 1208 is set. However, in the state in which the observation sample 1208 is set, a similar method can be applied by an observer specifying the white portion in the observation sample 1208.

In the combination in which there is no LBD filter 1207, IR cut filter 1211, etc., it is displayed on the monitor 1251 to and observer.

In addition, using the R/G and B/G as shown in FIG. 15 in the coordinates system indicating a chromaticity distribution is described. However, using a signal obtained by the image pickup element 1202 such as G/B, G/R, etc., the present invention is not limited to a specific coordinates system.

Although the type of microscope, each type of filter, and the light source 1205 are all checked as a combination of optical systems, only a part of them can be checked. In this case, the checking method is simpler.

The fifth mode for embodying the present invention is described below by referring to FIGS. 17 through 19. The configuration, processes, etc. similar to those according to the fourth mode for embodying the present invention are associated with the same reference numerals and step numbers, and the detailed descriptions are omitted here.

In the fifth mode for embodying the present invention, the color temperature during observation of the observation sample 1208 is determined.

Figure 17:
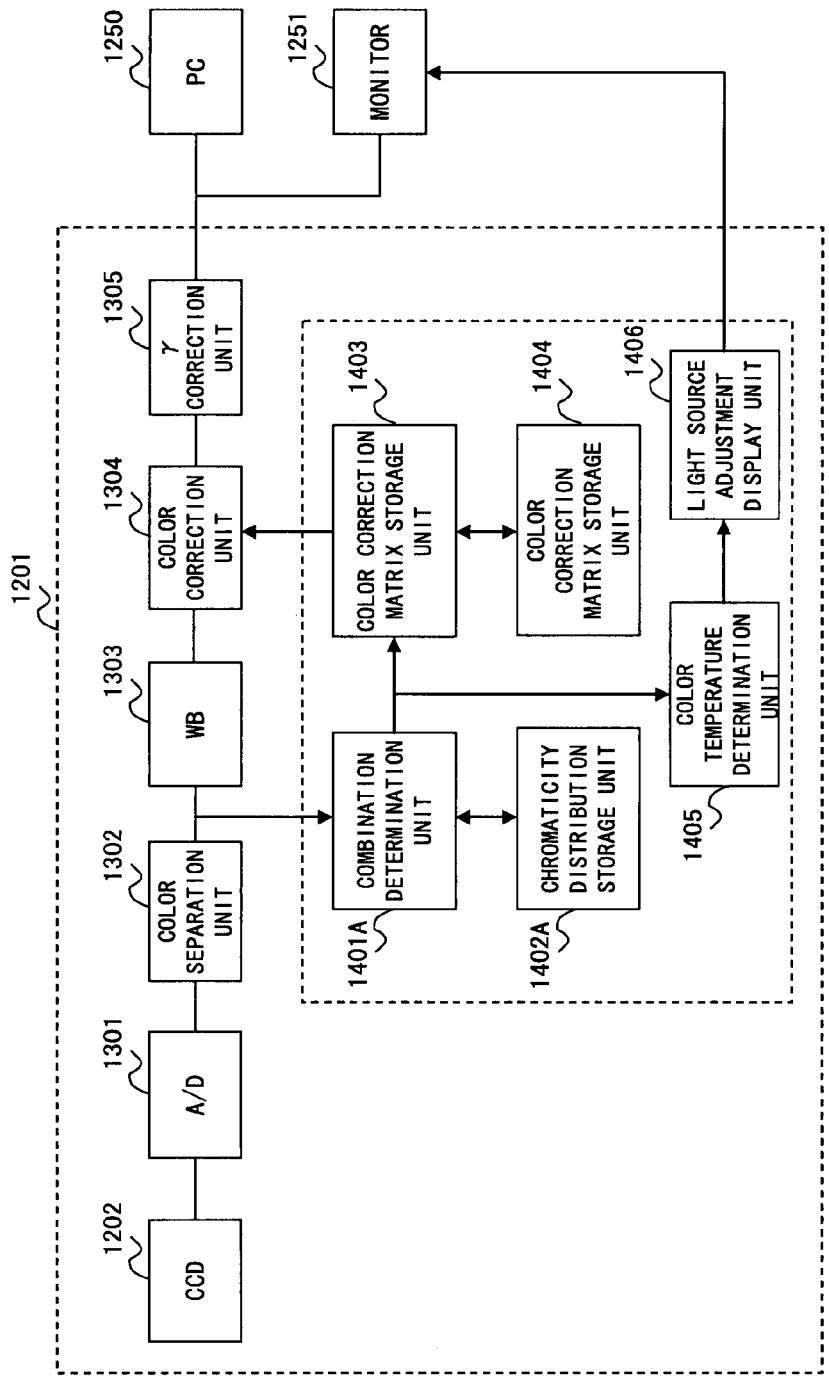
FIG. 17 shows the entire configuration of a system for use in the fifth mode for embodying the present invention.

FIG. 17 shows the entire configuration of the system according to the fifth mode for embodying the present invention. FIG. 18 shows chromaticity distribution data in the fifth mode for embodying the present invention as a distribution chart.

In FIG. 17, the chromaticity distribution storage unit 1402A stores a target value b (bx, by) in addition to the a (dark state) to c (bright state) indicating a change width by a color temperature change in the variation of the supplied voltage of the light source 1205 in the pattern communication state as shown in FIG. 18. The combination determination unit 1401A extracts a combination of optical systems from the coordinates P (Px, Py) of a signal value obtained by the chromaticity distribution storage unit 1402A and the image pickup element 1202.

A color temperature determination unit 1405 determines the brightness from a target value b on the basis of the relative position between the coordinates P of the signal value obtained by the image pickup element 1202 and the target value b of a combination of optical systems, and transmits a color temperature sufficiency signal from the determination result. When the determination is made, the amount of shift L from the target point b is obtained as the difference L between the target point b and the coordinates point P by the following equation 22

$$L=\sqrt{(bx-Px)^2+(by-Py)^2} \qquad \text{equation 22}$$

Then, a light source adjustment display unit 1406 displays to the monitor 1251 an adjustment instruction of the light source 1205 depending on the signal value obtained from the color temperature determination unit 1405.

Figure 19:
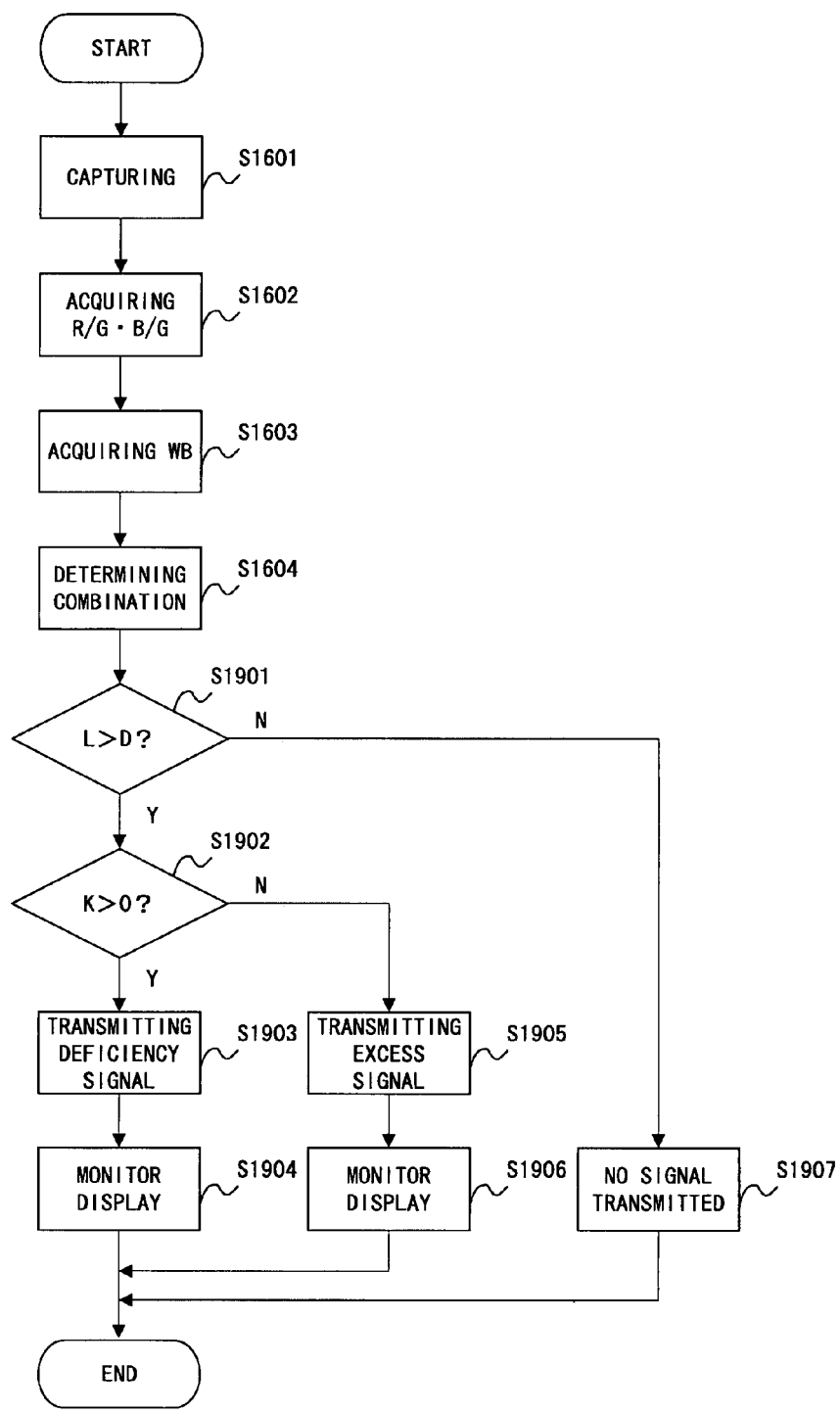
FIG. 19 is a flowchart showing a flow of the color correcting process according to the fifth mode for embodying the present invention.

FIG. 19 is a flowchart showing the flow of the color correcting process according to the fifth mode for embodying the present invention.

Step S1601 to step S1604 are similar to step S1601 to step S1604 in the color correcting process according to the fourth mode for embodying the present invention shown in FIG. 16. Therefore, the detailed description is omitted here.

After the determination of the combination in step S1604, it is determined by the color temperature determination unit 1405 in step S1901 which is higher, the amount of shift L or the predetermined value D. The amount of shift is compared with the predetermined value D because, when the amount L of shift is equal to or lower than the predetermined value D, it is not necessary to adjust the color temperature.

If the amount L of shift is higher than the predetermined value D (L>D) (YES in step S1901), then it is determined that there is a shift from the target color temperature, and it is determined in step S1902 whether or not the value of K (K=bx−Px) is positive.

If K is positive (K>0) (Y in step S1902), it is determined that the color temperature is low, and a deficiency signal indicating that the color temperature is low is transmitted to the light source adjustment display unit 1406 in step S1903. Upon receipt of the deficiency signal, a light source adjustment display unit 306 displays, for example, "Intensify the light" to the monitor 1251 in step S1904.

On the other hand, if K≦0 in step S1902 (N in step S1902), it is determined that the color temperature is high, and an excess signal indicating that the color temperature is too high is transmitted to the light source adjustment and display unit. Upon receipt of the excess signal, the light source adjustment display unit 1406 displays, for example, "Attenuate the light." to the monitor 1251 in step S1906.

If L≦0 (N in step S1901) in step S1901, the process terminates without transmission of the deficiency or excess signal in step A1907.

In the above-mentioned method, the color temperature of the light source 1205 is analyzed from the signal obtained by the microscope color image pickup apparatus 1201, and an instruction to adjust the light source 1205 can be issued to the observer.

As described above, each mode for embodying the present invention is described by referring to the attached drawings, but the microscope color image pickup apparatus according to the present invention is not limited to the above-mentioned modes for embodying the present invention if the functions can be realized by a single apparatus, a system including a plurality of apparatuses, an integrated apparatus, a system for performing a process over a network such as a LAN, a WAN, etc.

The apparatus can be realized by a system configured by a CPU, memory such as ROM and RAM, an input device, an output device, an external storage device, a media drive device, a portable storage medium, a network connection device connected via a bus. That is, the memory such as ROM and RAM, the external storage device, and the portable storage medium storing a program code of the software for realizing the system according to each mode for embodying the present invention can be provided for a microscope color image pickup apparatus, and the computer of the microscope color image pickup apparatus can read the program code can realize the present invention.

In this case, the program code itself that is read from the portable storage medium etc. realizes a new function of the present invention, and a portable storage medium etc. storing the program code configures the present invention.

A portable storage medium for providing a program code can be, for example, a flexible disk, a hard disk, an optical disk, a magneto optical disk, CD-ROM, CD-R, DVD-ROM, DVD-RAM, a magnetic tape, a non-volatile memory card, a ROM card, various storage media for storage through e-mail, personal computer communication, etc. through a network connection device (that is, a communication circuit).

By executing the program code read by the computer to the memory, the functions of the above-mentioned modes for embodying the present invention can be realized, and the functions of each mode can also be realized by the process all or a part of which is performed by the OS etc. operating on the computer on the basis of an instruction of the program code.

Furthermore, the program (data) provided from a program code read from the portable storage medium and a program (data) provider is written to the memory in the feature expansion board inserted into the computer or the feature expansion unit connected to the computer, and then at an instruction of the program code, the CPU etc. provided in the feature expansion and the feature expansion unit can perform all or a part of the actual process, and the process can realize the function of each mode for embodying the present invention.

That is, the present invention is not limited to each of the modes for embodying the present invention, but can have various configurations and forms within the scope of the gist of the present invention.

The present invention can provide a microscope color image pickup apparatus having the optimum color reproducibility depending on the status of the illumination light source of a microscope.

The present invention can estimate the illumination light source of a microscope.

The present invention can detect the status of an optical element attached to and detached from a microscope and a microscope color image pickup apparatus.

The present invention can provide a microscope color image pickup apparatus having the optimum color reproducibility on the basis of the status of the optical element attached to or detached from a microscope and a microscope color image pickup apparatus.

The present invention can detect a change with time of a microscope color image pickup apparatus.

The present invention can provide a microscope color image pickup apparatus having the optimum color reproducibility and capable of correcting the change with time of the microscope color image pickup apparatus.

The present invention can derive a combination of optical systems such as the type of light source during observation, the type of microscope, the type of filter, etc. from the signal value obtained by an image pickup element such as a CCD etc., based on which the value can be changed to the optimum color parameter (color correction matrix). Thus, the optimum color reproducibility corresponding to the difference in fine optical system can be realized, and an acceptable image can be provided for an observer.

Furthermore, according to the present invention, when an observation is performed with a specific filter configuration, an observer can be automatically informed of or can detect the filter configuration. Thus, when an observer is performing the observation with a filter configuration not desired for the capturing operation, the observer can be notified of the undesired observation. Thus, the observer can avoid careless observation, thereby improving the convenience.

Additionally, the present invention can analyze the color temperature of a light source from a signal value obtained by an image pickup element such as a CCD etc., and enables an observer to perform an appropriate process on the basis of the analysis result. Thus, the observer can avoid the observation under an inappropriate color temperature, thereby obtaining an acceptable image.

What is claimed is:

1. A microscope color image pickup apparatus for use in a microscope, comprising:
   an image pickup unit capturing a color image observed by the microscope;
   a camera characteristic information storage unit storing camera characteristic information about a characteristic of the microscope color image pickup apparatus;
   a color correction parameter calculation unit calculating a color correction parameter for a color correcting process on the color image captured by the image pickup unit according to the color image captured by the image pickup unit and the camera characteristic information stored in the camera characteristic information storage unit;

a color correcting unit performing a color correcting process on the color image captured by the image pickup unit according to the color correction parameter calculated by the color correction parameter calculation unit;

an optical element detection unit detecting an optical element inserted into an optical path in which the illumination light travels from the illumination light source of the microscope to the image pickup unit on a basis of the color image captured by the image pickup unit and the camera characteristic information stored in the camera characteristic information storage unit; and a color correction parameter storage unit storing a plurality of color correction parameters calculated by the color correction parameter calculation unit, wherein the color correcting unit acquires, from the color correction parameter storage unit, the color correction parameter corresponding to the optical element detected by the optical element detection unit, and performs the color correcting process on the color image captured by the image pickup unit using the acquired color correction parameter.

2. The apparatus according to claim 1, further comprising:
an illumination light source estimation unit estimating a type of an illumination light source of the microscope on a basis of a color image captured by the image pickup unit and the camera characteristic information stored in the camera characteristic information storage unit, wherein the color correcting unit acquires a color correction parameter corresponding to the illumination light source estimated by the illumination light source estimation unit from the color correction parameter storage unit, and performs a color correcting process on the color image captured by the image pickup unit on a basis of the acquired color correction parameter.

3. The apparatus according to claim 1, wherein
the color correcting unit acquires a color correction parameter corresponding to no detecting an optical element from the color correction parameter storage unit when no optical element is detected by the optical element detection unit, and performs a color correcting process on the color image captured by the image pickup unit using the acquired color correction parameter.

4. The apparatus according to claim 1, wherein
the optical element is an optical filter.

5. A microscope color image pickup apparatus for use in a microscope, comprising:
an image pickup unit capturing a color image observed by the microscope;
a camera characteristic information storage unit storing camera characteristic information about a characteristic of the microscope color image pickup apparatus;
a color correction parameter calculation unit calculating a color correction parameter for a color correcting process on the color image captured by the image pickup unit according to the color image captured by the image pickup unit and the camera characteristic information stored in the camera characteristic information storage unit;
a color correcting unit performing a color correcting process on the color image captured by the image pickup unit according to the color correction parameter calculated by the color correction parameter calculation unit;

a change-with-time detection unit detecting a change with time of the camera characteristic information on a basis of the color image captured by the image pickup unit and the camera characteristic information stored in the camera characteristic information storage unit; and a color correction parameter storage unit storing the plurality of color correction parameters calculated by the color correction parameter calculation unit, wherein the color correcting unit acquires the color correction parameter corresponding to the change with time detected by the change-with-time detection unit from the color correction parameter storage unit, and performs a color correcting process on the color image captured by the image pickup unit using the acquired color correction parameter.

6. The apparatus according to claim 1, wherein
the camera characteristic information indicates a spectral sensitivity characteristic of the microscope color image pickup apparatus or an integral value of the spectral sensitivity characteristic.

7. A non-transitory computer readable storage medium for storing a microscope color image pickup program used to direct a computer of a microscope color image pickup apparatus for use in a microscope to perform the function, comprising:
an image pickup procedure for capturing a color image observed by the microscope;
a camera characteristic information storage procedure storing camera characteristic information about a characteristic of the microscope color image pickup apparatus;
a color correction parameter calculation procedure for calculating a color correction parameter for a color correcting process on the color image captured by the image pickup procedure according to the color image captured by the image pickup procedure and the camera characteristic information stored in the camera characteristic information storage procedure;
a color correcting procedure for performing a color correcting process on the color image captured by the image pickup procedure according to the color correction parameter calculated by the color correction parameter calculation procedure;
an optical element detection procedure for detecting an optical element inserted into an optical path in which the illumination light travels from the illumination light source of the microscope to the image pickup procedure on a basis of the color image captured by the image pickup procedure and the camera characteristic information stored in the camera characteristic information storage procedure; and
a color correction parameter storage procedure for storing the plurality of color correction parameters calculated by the color correction parameter calculation procedure, wherein
the color correcting procedure acquires the color correction parameter corresponding to the optical element detected by the optical element detection procedure, and performs the color correcting process on the color image captured by the image pickup procedure using the acquired color correction parameter.

8. A microscope color image pickup method used with a microscope color image pickup apparatus for use in a microscope, comprising:
capturing by an image pickup unit a color image observed by the microscope;
calculating by a color correction parameter calculation unit a color correction parameter for use in a color correcting process on the captured color image on a basis of the captured color image and camera characteristic information about a characteristic of the microscope color image pickup apparatus stored in the camera characteristic information storage unit;

performing by a color correcting unit a color correcting process on the captured color image on a basis of the calculated color correction parameter;

detecting by an optical element detection unit an optical element inserted into an optical path in which the illumination light travels from the illumination light source of the microscope to the image pickup unit on a basis of the color image captured by the image pickup unit and the camera characteristic information stored in the camera characteristic information storage unit; and storing by a color correction parameter storage unit the plurality of color correction parameters calculated by the color correction parameter calculation unit, wherein the color correcting unit acquires the color correction parameter corresponding to the optical element detected by the optical element detection unit, and performs the color correcting process on the color image captured by the image pickup unit using the acquired color correction parameter.

* * * * *